US012668014B2

(12) United States Patent
Mamak et al.

(10) Patent No.: US 12,668,014 B2
(45) Date of Patent: Jun. 30, 2026

(54) MULTILAYER THERMOPLASTIC ARTICLE WITH UNIQUE VISUAL EFFECTS AND A CORE CONTAINING RECYCLED THERMOPLASTIC MATERIAL

(71) Applicant: The Procter & Gamble Company, Cincinnati, OH (US)

(72) Inventors: Marc Andrew Mamak, Mason, OH (US); Mark Lewis Agerton, Mason, OH (US); Bradley Scott Neufarth, Loveland, OH (US); Andrew Joseph Horton, Middletown, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 120 days.

(21) Appl. No.: 17/226,203

(22) Filed: Apr. 9, 2021

(65) Prior Publication Data

US 2021/0316493 A1 Oct. 14, 2021

Related U.S. Application Data

(60) Provisional application No. 63/008,337, filed on Apr. 10, 2020.

(51) Int. Cl.
 *B29C 49/22* (2006.01)
 *B29C 49/00* (2006.01)
 (Continued)

(52) U.S. Cl.
 CPC .......... *B29C 49/22* (2013.01); *B29C 49/0005* (2013.01); *B32B 27/08* (2013.01);
 (Continued)

(58) Field of Classification Search
 None
 See application file for complete search history.

(56) References Cited

U.S. PATENT DOCUMENTS

| 1,554,191 A | 9/1925 | Alexander |
| 3,222,439 A | 12/1965 | Bolomey et al. |
| | (Continued) | |

FOREIGN PATENT DOCUMENTS

| CN | 1538995 A | 10/2004 |
| CN | 1673284 A | 9/2005 |
| | (Continued) | |

OTHER PUBLICATIONS

Fundamental Technology of Coating Material, published on Jun. 30, 2012, 12 pgs.

(Continued)

*Primary Examiner* — Thomas J Kessler
(74) *Attorney, Agent, or Firm* — Matthew J. Spegele; Alexandra S. Anoff

(57) ABSTRACT

A blow molded multilayer article with a hollow body and a wall being formed by at least three layers including a first skin layer, a second skin layer and a core sandwiched between the first and second skin layers. The skin layers can include a first thermoplastic material and an effect pigment and/or a porogen. The core can include recycled thermoplastic material and pigment and/or dye. The article can contain greater than 30% recycled thermoplastic material.

19 Claims, 7 Drawing Sheets
(4 of 7 Drawing Sheet(s) Filed in Color)

(51) Int. Cl.

| | |
|---|---|
| *B29K 67/00* | (2006.01) |
| *B32B 27/08* | (2006.01) |
| *B32B 27/20* | (2006.01) |
| *B32B 27/36* | (2006.01) |

(52) U.S. Cl.
CPC .............. *B32B 27/20* (2013.01); *B32B 27/36* (2013.01); *B29C 2791/002* (2013.01); *B29K 2067/003* (2013.01); *B32B 2274/00* (2013.01); *B32B 2307/4026* (2013.01); *B32B 2307/41* (2013.01); *B32B 2307/732* (2013.01); *B32B 2307/738* (2013.01); *B32B 2439/60* (2013.01)

(56) References Cited

U.S. PATENT DOCUMENTS

| | | | |
|---|---|---|---|
| 3,420,924 A | 1/1969 | Mason et al. | |
| 3,550,197 A | 12/1970 | Szajna et al. | |
| 4,174,413 A | 11/1979 | Kataoka et al. | |
| 4,421,560 A | 12/1983 | Kito et al. | |
| 4,457,961 A | 7/1984 | Nakazawa | |
| 4,535,901 A | 8/1985 | Okudaira | |
| 4,728,549 A | 3/1988 | Shimizu et al. | |
| 4,868,026 A | 9/1989 | Shimizu | |
| 4,919,983 A | 4/1990 | Fremin | |
| 4,957,949 A | 9/1990 | Kamada et al. | |
| 4,994,313 A | 2/1991 | Shimizu | |
| 5,431,697 A | 7/1995 | Kamata et al. | |
| 5,595,799 A | 1/1997 | Beck et al. | |
| 5,628,950 A | 5/1997 | Schrenk et al. | |
| 5,628,957 A | 5/1997 | Collette et al. | |
| 5,712,009 A | 1/1998 | Moore et al. | |
| 5,849,224 A | 12/1998 | Valyi | |
| 5,927,525 A | 7/1999 | Darr et al. | |
| 6,123,211 A | 9/2000 | Rashid et al. | |
| 6,129,960 A | 10/2000 | Kudert et al. | |
| 6,294,602 B1 | 9/2001 | Shimo et al. | |
| 6,296,911 B1 | 10/2001 | Catarineu | |
| 6,344,249 B1 | 2/2002 | Maruyama | |
| 6,405,867 B1 | 6/2002 | Moore | |
| 6,562,276 B1 | 5/2003 | Shelby et al. | |
| 6,596,213 B2 | 7/2003 | Swenson | |
| 6,663,822 B1 | 12/2003 | Cargill | |
| 6,737,132 B1 | 5/2004 | Michihata et al. | |
| 6,815,080 B2 | 11/2004 | Omori | |
| 6,878,774 B2 | 4/2005 | Kikuchi et al. | |
| 6,911,266 B1 | 6/2005 | Skov | |
| 6,929,136 B2 | 8/2005 | Salazar-leal | |
| 6,929,836 B2 | 8/2005 | Kikuchi | |
| 7,534,829 B2 | 5/2009 | Tai et al. | |
| 7,662,466 B2 | 2/2010 | Seeboth et al. | |
| 7,828,890 B2 | 11/2010 | Henglein | |
| 7,837,048 B2 | 11/2010 | Lusker | |
| 7,906,054 B2 | 3/2011 | Hirschfelder et al. | |
| 8,061,540 B2 | 11/2011 | Toyoda | |
| 8,097,317 B2 | 1/2012 | Katou | |
| 8,124,234 B2 | 2/2012 | Weaver et al. | |
| 8,485,935 B2 | 7/2013 | Hecht | |
| 8,535,595 B2 | 9/2013 | Meiki et al. | |
| 8,580,365 B2 | 11/2013 | Abe | |
| 8,734,923 B2 | 5/2014 | Shi | |
| 8,883,920 B2 | 11/2014 | Inoue et al. | |
| 8,895,120 B2 | 11/2014 | Dierickx | |
| 8,968,147 B2 | 3/2015 | Hecht | |
| 9,000,068 B2 | 4/2015 | Trummer | |
| 9,114,895 B2 | 8/2015 | Sato et al. | |
| 9,162,429 B2 | 10/2015 | Suga et al. | |
| 9,597,825 B2 | 3/2017 | Schmidt et al. | |
| 9,708,092 B2 | 7/2017 | Bowen et al. | |
| 9,731,482 B2 | 8/2017 | Arakawa et al. | |
| 9,862,157 B2 | 1/2018 | Hosokoshiyama | |
| 10,279,948 B2 | 5/2019 | Yang et al. | |
| 10,518,922 B2 | 12/2019 | Yang et al. | |
| 11,046,473 B2 | 6/2021 | Agerton et al. | |
| 2002/0009565 A1 | 1/2002 | Fehn | |

| | | | |
|---|---|---|---|
| 2002/0090473 A1* | 7/2002 | Lee | C23C 16/402 |
| | | | 264/318 |
| 2004/0146675 A1 | 7/2004 | Hashimoto et al. | |
| 2004/0194663 A1 | 10/2004 | Li | |
| 2005/0011892 A1 | 1/2005 | Nakajima | |
| 2005/0142309 A1 | 6/2005 | Goto et al. | |
| 2005/0170113 A1 | 8/2005 | Hill | |
| 2005/0170114 A1 | 8/2005 | Hill | |
| 2005/0287323 A1 | 12/2005 | Akiyama et al. | |
| 2006/0029823 A1* | 2/2006 | Brown | B32B 1/02 |
| | | | 428/480 |
| 2006/0156957 A1* | 7/2006 | Fuller | C09C 1/0039 |
| | | | 106/436 |
| 2006/0263554 A1 | 11/2006 | Yamada et al. | |
| 2007/0228598 A1 | 10/2007 | Akiyama | |
| 2008/0017076 A1 | 1/2008 | Noguchi | |
| 2008/0047470 A1* | 2/2008 | Pfaff | C03C 1/04 |
| | | | 106/417 |
| 2008/0193787 A1 | 8/2008 | Dierickx | |
| 2008/0241447 A1 | 10/2008 | Shi | |
| 2008/0317989 A1 | 12/2008 | Abe et al. | |
| 2009/0233026 A1 | 9/2009 | Akiyama | |
| 2010/0028577 A1 | 2/2010 | Siegl | |
| 2010/0206784 A1 | 8/2010 | Weaver et al. | |
| 2010/0307633 A1 | 12/2010 | Dierickx | |
| 2011/0100857 A1 | 5/2011 | Wang et al. | |
| 2012/0165422 A1 | 6/2012 | Vernon et al. | |
| 2012/0171401 A1 | 7/2012 | Katou | |
| 2012/0256356 A1 | 10/2012 | Akiyama | |
| 2013/0069268 A1 | 3/2013 | Liu et al. | |
| 2013/0273287 A1 | 10/2013 | Luo et al. | |
| 2013/0313217 A1 | 11/2013 | Yamamoto et al. | |
| 2014/0044904 A1 | 2/2014 | De Belder | |
| 2014/0054255 A1 | 2/2014 | Hosokoshiyama et al. | |
| 2014/0119813 A1 | 5/2014 | Moselage, III | |
| 2015/0079320 A1 | 3/2015 | Katou | |
| 2015/0105532 A1* | 4/2015 | Allen | C07C 51/09 |
| | | | 528/307 |
| 2016/0017092 A1 | 1/2016 | Iwamoto et al. | |
| 2016/0368649 A1 | 12/2016 | Eschenburg | |
| 2017/0021552 A1 | 1/2017 | Dygert | |
| 2017/0197351 A1 | 7/2017 | Chiba | |
| 2017/0204251 A1 | 7/2017 | Agerton et al. | |
| 2017/0259486 A1 | 9/2017 | Koerner | |
| 2018/0002071 A1 | 1/2018 | Hosokoshiyama et al. | |
| 2019/0009483 A1 | 1/2019 | Meadows et al. | |
| 2019/0105805 A1 | 4/2019 | Dubuque | |
| 2019/0112091 A1* | 4/2019 | Neufarth | B29C 49/06 |
| 2019/0143576 A1 | 5/2019 | Chiba et al. | |
| 2020/0024021 A1 | 1/2020 | Agerton | |
| 2020/0122873 A1 | 4/2020 | Agerton | |
| 2020/0171727 A1 | 6/2020 | Witz | |
| 2020/0282688 A1* | 9/2020 | Schurr | B32B 27/32 |
| 2020/0324455 A1 | 10/2020 | Agerton | |
| 2020/0324456 A1 | 10/2020 | Mamak | |
| 2020/0399463 A1 | 12/2020 | Wieloch et al. | |
| 2021/0206141 A1 | 7/2021 | Neufarth et al. | |
| 2021/0221551 A1 | 7/2021 | Neufarth et al. | |
| 2021/0269188 A1 | 9/2021 | Agerton et al. | |
| 2022/0017254 A1* | 1/2022 | Tanchette | B29C 49/06 |

FOREIGN PATENT DOCUMENTS

| | | | | |
|---|---|---|---|---|
| CN | 1988995 A | 6/2007 | | |
| CN | 201484752 U | 5/2010 | | |
| CN | 102026793 A | 4/2011 | | |
| CN | 102498045 A | 6/2012 | | |
| CN | 102575076 A | 7/2012 | | |
| CN | 106573447 A | 4/2017 | | |
| CN | 107548352 A | 1/2018 | | |
| CN | 211732096 U | 10/2020 | | |
| DE | 202004018510 U1 | 9/2005 | | |
| DE | 102005022633 A1 | 11/2006 | | |
| DE | 102013011403 A1 | 1/2015 | | |
| EP | 0328014 A2 | 8/1989 | | |
| EP | 0354255 A1 | 2/1990 | | |
| EP | 1681239 A1 * | 7/2006 | ........ | B29C 49/0073 |
| EP | 2231373 B1 | 7/2015 | | |

(56)                References Cited

FOREIGN PATENT DOCUMENTS

| | | | | | |
|---|---|---|---|---|---|
| EP | 2957514 | A1 * | 12/2015 | ............. | B32B 1/00 |
| GB | 201203964 | | 4/2012 | | |
| JP | S5381569 | A | 7/1978 | | |
| JP | S57128520 | A | 8/1982 | | |
| JP | S6294541 | A | 5/1987 | | |
| JP | H0295631 | A | 4/1990 | | |
| JP | H05042641 | A | 2/1993 | | |
| JP | 06171638 | | 6/1994 | | |
| JP | H06255052 | A | 9/1994 | | |
| JP | H07186190 | A | 7/1995 | | |
| JP | H07205195 | A | 8/1995 | | |
| JP | H08156202 | A | 6/1996 | | |
| JP | 2970292 | B2 | 11/1999 | | |
| JP | 2000264325 | A | 9/2000 | | |
| JP | 3134376 | B2 | 2/2001 | | |
| JP | 2002104362 | A | 4/2002 | | |
| JP | 2004148616 | A | 5/2004 | | |
| JP | 2004203906 | A | 7/2004 | | |
| JP | 2005219760 | A | 8/2005 | | |
| JP | 2005308567 | A | 11/2005 | | |
| JP | 2006168250 | A | 6/2006 | | |
| JP | 2006306470 | A | 11/2006 | | |
| JP | 2006312485 | A | 11/2006 | | |
| JP | 2007223628 | A | 6/2007 | | |
| JP | 2007186190 | A | 7/2007 | | |
| JP | 2007205195 | A | 8/2007 | | |
| JP | 2008156202 | A | 7/2008 | | |
| JP | 2008189314 | A | 8/2008 | | |
| JP | 2008208288 | A | 9/2008 | | |
| JP | 2009062059 | A | 3/2009 | | |
| JP | 4674136 | B2 | 1/2011 | | |
| JP | 5029879 | B2 | 9/2012 | | |
| JP | 2013028137 | A | 2/2013 | | |
| JP | 2015131438 | A | 7/2015 | | |
| JP | 2015131492 | A | 7/2015 | | |
| JP | 3207320 | U | 10/2016 | | |
| JP | 2017036069 | A | 2/2017 | | |
| JP | 2017128659 | A | 7/2017 | | |
| JP | 2018039536 | A | 3/2018 | | |
| JP | 2018058604 | A | 4/2018 | | |
| JP | 6593187 | B2 | 10/2019 | | |
| KR | 20010047311 | A | 6/2001 | | |
| TW | 201704107 | A | 2/2017 | | |
| TW | 201704108 | A | 2/2017 | | |
| TW | 201706189 | A | 2/2017 | | |
| WO | 2006066825 | A2 | 6/2006 | | |
| WO | 2006127569 | A2 | 11/2006 | | |
| WO | 2007065508 | A2 | 6/2007 | | |
| WO | 2007066508 | A1 | 6/2007 | | |
| WO | 2007098837 | A1 | 9/2007 | | |
| WO | WO-2009079724 | A2 * | 7/2009 | ............ | B29B 11/14 |
| WO | 2016031150 | A1 | 3/2016 | | |
| WO | 2017134099 | A1 | 8/2017 | | |
| WO | 2019133713 | A1 | 7/2019 | | |
| WO | 2020081114 | A1 | 4/2020 | | |

OTHER PUBLICATIONS

PCT Search Report and Written Opinion for PCTUS2021/026503 dated Jul. 21, 2021.
All final and non-final office actions for U.S. Appl. No. 16/158,719.
All final and non-final office actions for U.S. Appl. No. 16/381,125.
All final and non-final office actions for U.S. Appl. No. 16/845,283.
All final and non-final office actions for U.S. Appl. No. 16/845,295.
All Office Actions, U.S. Appl. No. 17/144,281.
All Office Actions, U.S. Appl. No. 17/217,751.
All Office Actions, U.S. Appl. No. 17/320,569.
All Office Actions, U.S. Appl. No. 16/158,841.
C-Mold Co-Injection, Chapter 20, Copyright 1996 Advanced CAE Technology, Inc.
PCT Search Report and Written Opinion for PCT/US2018/053683 dated Feb. 15, 2019.
Extended European Search Report and Search Opinion; Application No. 17196087.5; dated Mar. 29, 2018; 12 pages.
The Preferential Heating process for PET flat or asymmetric containers on SBO Universal and SBO Compact blow molders, www.sidel.com, publication date unknown.
Unpublished U.S. Appl. No. 17/226,203, filed Apr. 9, 2021, to Marc Andrew Mamak et. al.
All Office Actions; U.S. Appl. No. 19/354,950, filed Oct. 10, 2025.
Unpublished U.S. Appl. No. 19/354,950, filed Oct. 10, 2025, to Marc Andrew Mamak et. al.

* cited by examiner

MULTILAYER THERMOPLASTIC ARTICLE WITH UNIQUE VISUAL EFFECTS AND A CORE CONTAINING RECYCLED THERMOPLASTIC MATERIAL

FIELD OF THE INVENTION

The present invention relates to multilayer thermoplastic articles with unique visual effects, in particular multilayer articles with a core layer that contains recycled thermoplastic material. The invention relates also to preforms for making such articles and to methods for making these preforms and articles.

BACKGROUND OF THE INVENTION

Many consumers like purchasing articles, particularly hair and beauty products, in packaging that is both eye-catching and functional. For hair and beauty products, many consumers find plastic packaging particularly desirable because plastic packages are generally light weight, while still providing good mechanical properties, are easy to use, and shatter-resistant, unlike glass, which is especially important for hair and beauty products that are often used with slippery hands in the bathroom, bath, or shower while the user is barefoot. Many consumers also like plastic, especially polyethylene terephthalate (PET), high density polyethylene (HDPE), and polypropylene (PP), because it is recyclable.

It can be desirable to package hair and beauty products in containers that are made from at least some recycled plastic material. However, chemically recycled plastic, which can have similar physical properties to virgin plastic, is currently available in limited supply. In some instances, mechanical recycling may be preferred because it is more available than chemical recycling. However, mechanical recycled plastics can make off-colored bottles with poor structural integrity. For example, the most popular recycled PET is mechanically recycled PET that is sold as "clear," which produces bottles with a gray tint that is generally undesirable to consumers when packaging hair and beauty products. Less popular recycled PET can be green or mixed, which generally produces unattractive off-color containers. Furthermore, there are many opportunities to harvest even more colored PET from examples such as carpets and non-beverage containers, which when recycled would have a highly colored and/or dark color. These examples are not currently harvested for recycling, since the currently market for this material is very limited.

As such, there remains a need for a visually appealing, blow molded article with good mechanical properties that contains recycled material, particularly mechanically recycled plastic material including colored recycled PET.

SUMMARY OF THE INVENTION

A blow molded multilayer article comprising: (a) a hollow body defined by a wall comprising an inner surface and an outer surface, the wall being formed in at least one region by 3 or more layers comprising: (i) a first skin layer and a second skin layer comprising: a first thermoplastic material; and effect pigment and/or porogen; wherein the first skin layer comprises the outer surface of the wall in the region and the second skin layer comprises the inner surface of the wall in the region; (ii) a core sandwiched between the first skin layer and the second skin layer, wherein the core comprises: from about 90% to about 99% recycled thermoplastic material comprising a second thermoplastic material and greater than 200 ppm impurities; pigment and/or dye; wherein the article comprises greater than 30% recycled thermoplastic material.

A blow molded multilayer article comprising: (a) a hollow body defined by a wall comprising an inner surface and an outer surface, the wall being formed in at least one region by 3 or more layers comprising: (i) a first skin layer and a second skin layer comprising: a thermoplastic material; and effect pigment and/or porogen; wherein the first skin layer comprises the outer surface of the wall in the region and the second skin layer comprises the inner surface of the wall in the region; (i) an opaque core sandwiched between the first skin layer and the second skin layer, wherein the core comprises: from about 90% to about 99% recycled thermoplastic material comprising a second thermoplastic material and an L* value of less than or equal to 80; a pigment and/or dye; wherein the first skin layer and the core are slightly interpenetrated at an interface between the first skin layer and the core.

An array of articles, wherein each article comprises (a) a hollow body defined by a wall comprising an inner surface and an outer surface, the wall being formed in at least one region by 3 or more layers comprising: (i) a first skin layer and a second skin layer comprising: a thermoplastic material; and an effect pigment and/or porogen; wherein the first skin layer comprises the outer surface of the wall in the region and the second skin layer comprises the inner surface of the wall in the region; (ii) a core sandwiched between the first skin layer and the second skin layer, wherein the core comprises: mechanically recycled thermoplastic material comprising a second thermoplastic material; a pigment and/or dye; wherein each article comprises a $\Delta E^*-15°$ vs $45°$ using illumination at $45°$, $\Delta L^*$, and mean $C^*$ and the $\Delta E^*-15°$ vs $45°$, $\Delta L^*$ that varies by less than 6 units, across the array.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While the specification concludes with claims particularly pointing out and distinctly claiming the subject matter of the present invention, it is believed that the invention can be more readily understood from the following description taken in connection with the accompanying drawings, in which:

DETAILED DESCRIPTION OF THE INVENTION

Many consumers want to purchase beauty care products in aesthetically pleasing, lightweight, shatter-proof, plastic packages that are at least partially formed from recycled material. However, it can be difficult to make this kind of package. Consumers are increasingly interested in knowing the actual percent of recycled plastic the packaging contains. For example, many current PET ISBM bottles for beverages contains only 11% recycled material for the North American market and 27% recycled material for the Western Europe market.

Chemically recycled plastic can resemble virgin plastic but, currently there is not enough available for large scale manufacturing. Mechanically recycled material is more readily available but can have an unattractive appearance that can include low gloss, high haze, and/or an off color and may not provide enough structural integrity for a bottle that contains beauty care products.

Figure 1:
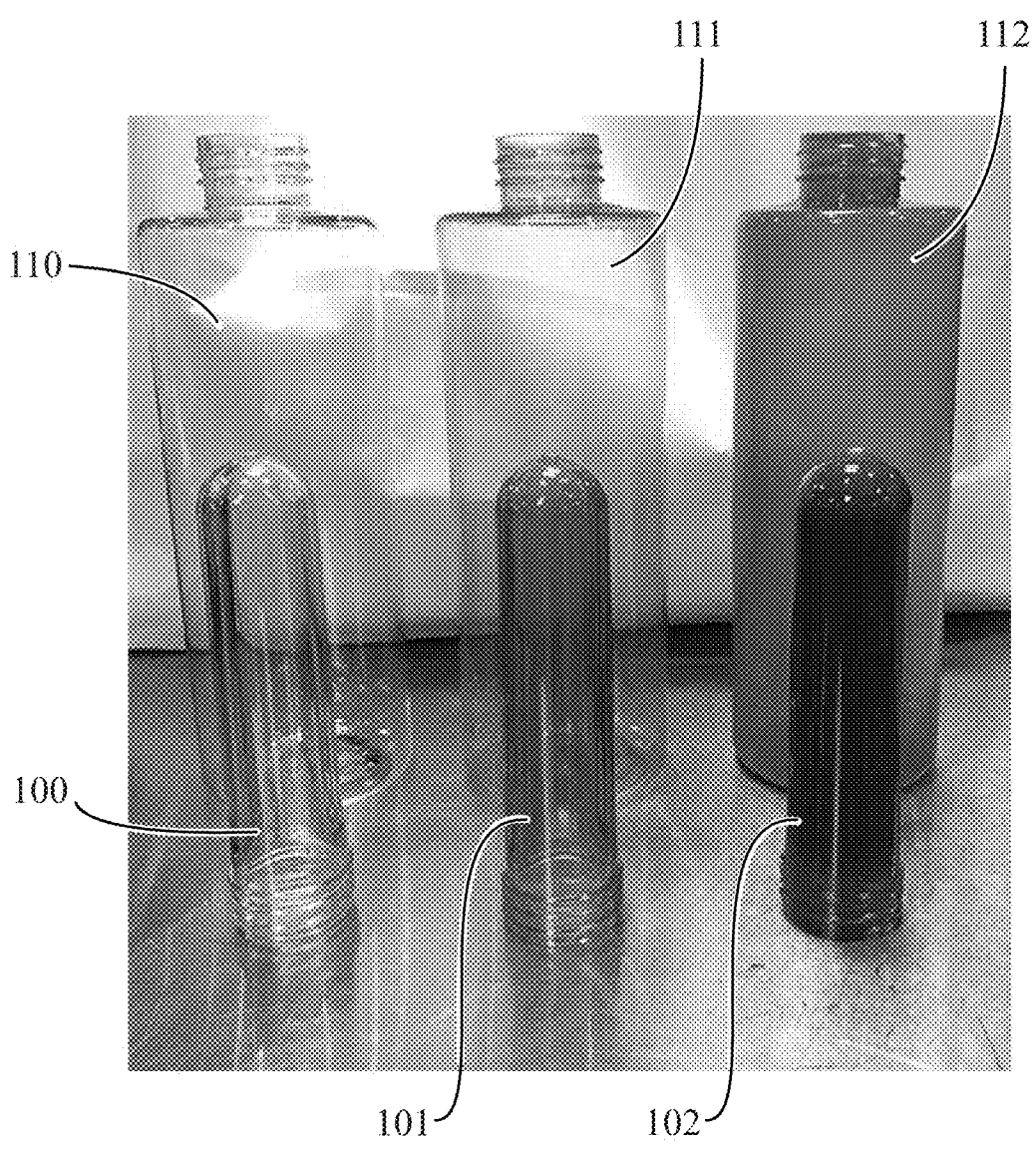
FIG. 1 is a photograph of preforms and bottles made from different recycled PET materials.

FIG. 1 shows photographs of preforms 100, 101, and 102 and bottles 110, 111, and 112 made via ISBM. Preform 100 and bottle 110 contain 100% virgin PET (clear pellets, available from DAK Americas®, Richmond, Indiana, USA) in the core and virgin PET in the skin layers and both preform 100 and bottle 110 are clear to use for comparison. This clarity is what beauty care consumers generally prefer for packaging that connotates luxury and quality, which may be diminished by the any variation of color.

Additionally, there is limited availability for truly "clear" mechanically recycled PET because of additives, used in the processing or stabilizing of the PET bottles and chemicals absorbed during use of the article. The PET ISBM bottles commonly used in the beverage industry are mainly clear and transparent and use "nearly clear" mechanically recycled PET in their packages that contain recycled material. Often times these bottles have only small amounts of recycled content due the color shift which occurs from the off tint.

Preform 101 and bottle 111 contain 75% "virgin" PET in the core and 25% chemical recycled PET (pellets available from Indorama®, London) in the skin layers. Preform 101 and bottle 111 have a gray tint, which is less appealing to beauty consumers.

Preform 102 and bottle 112 contain 40% "green" recycled PET (green pellets, available from Evergreen Plastics®, Ohio, USA) in the core and 25% chemical recycled and 75% virgin PET in the skin layers. It is advantageous to use "green" recycled PET because it is readily available. However, preform 102 and bottle 112 are a swamp water green color that is unappealing to consumers, especially consumers who are purchasing beauty care products.

Figure 2:
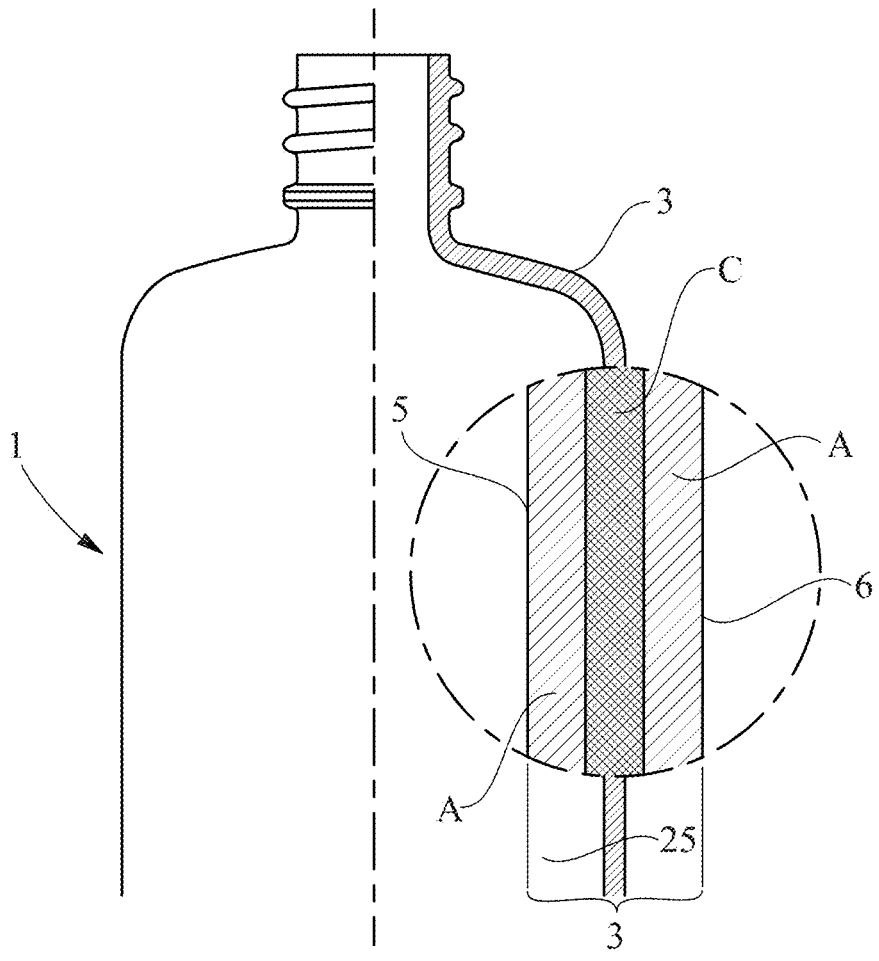
FIG. 2 represents schematically a bottle according to the showing an enlarged schematic cross-section thereof with three layers.

It was found that articles with a premium appearance and strong structural properties can be made using a significant amount of recycled thermoplastic material, including mechanically recycled PET that is clear, green, or otherwise colored including dark colors such as browns, grays, and blacks. FIG. 2 shows hollow article 1, in this example the hollow article is a container, specifically an opaque bottle. The hollow article 1 includes hollow body 25 defined by wall 3 having an inner surface 5 and an outer surface 6. As shown in the enlarged cross-section, article wall 3 has three layers. The wall can be formed without adhesives (or substantially free of adhesives) by injection stretch blow molding (ISBM). The skin layers (A) can comprise the effect pigments. The core layer (C) can be opaque and can comprise recycled thermoplastic material, in particular mechanically recycled thermoplastic material including but not limited to clear, green, or otherwise colored PET, pigment including opacifying pigments, toner, and/or dye. When the core is a separate, opaque layer, the core can absorb the transmitted complementary colors and can allow enhanced colors and/or brilliant angle dependent colors to be observed. The core can be any color. If a dark or black color is placed behind the effect pigment, such as a colored core, this absorbs much of the transmitted light, which can result in a large chromatic response, which can catch a consumer's eye as they walk past the article on the store shelf.

It has been found that in the articles described herein, the effect pigment particles in the skin layers can be predominantly oriented so that their face is parallel to the surface of the article. Without being bound by theory, it is believed that the ratio of oriented versus mal-oriented platelets is higher may be due to a combination of factors including the fact that the interface between each stream experiences higher shear versus similar locations in a monolayer article where the effect pigments are dispersed in the entire wall of the article which is thicker (at parity mechanical strength of the article) than the skin layers of a multilayer article. In monolayer articles the particles are less concentrated in the region of high shear thus they have more free space to tumble/rotate 360° during the injection molding process while, in a multilayer article, the skin layers, are much thinner as each skin layer only represents a portion of the total thickness of the article's wall, so that the injection molding and stretching steps provide for more optimum orientation of a larger percentage of platelet like pigment particles. Furthermore, the dispersion of effect pigments within the skin layers can result in better spatial overlap between adjacent platelets such that a higher percent of incident light is reflected nearer to the outer surface in comparison to monolayer articles.

It has further been found that the tendency for the platelet effect pigments to orient parallel to the surface of the article persist even when the article is irregularly shaped. As such, the shape of the article can be further used to modify the visual effects generated by the article from the point of view of a person viewing the article, depending on the orientation of the article when being viewed.

The core layer(s) can have from about 0.1% to about 6%, from about 0.3% to about 4%, and/or from about 0.5% to about 2% pigment and/or dye. The core layer(s) can contain from about 94% to about 99.9%, from about 96% to about 99.7%, from about from about 98% to about 99.5%, by weight of the core layer(s), recycled thermoplastic material. Recycled thermoplastic material can include a thermoplastic material and optionally impurities such as colorants/dyes, additives, catalysts, and/or other non-thermoplastic elements and/or compounds from the source material. The recycled thermoplastic material can include greater than 1000 ppm, greater than 500 ppm, and/or greater than 200 ppm, by weight of the core layer, impurities. The recycled thermoplastic material can include less than 2%, less than 1.5%, less than 1%, less than 0.5%, less than 0.25%, less than 0.1%, and less than 0.05%, by weight of the core layer(s), impurities. The recycled thermoplastic material can include from about 0.01% to about 2%, from about 0.05% to about 1%, and/or from about 0.1% to about 0.75%, by weight of the core layer(s), impurities.

The thermoplastic material can be PET. The core can contain less than 99%, less than 98%, less than 96%, less than 95%, and/or less than 94%, by weight of the core layer, PET. The core can contain from about 90% to about 99%, from about 92% to about 98%, from about 93% to about 97%, and/or from about 94% to about 96%, by weight of the core layer, PET. In some examples, substantially all the thermoplastic material in the core is a recycled thermoplastic resin and in other examples substantially all the thermoplastic material in the core is a mechanically recycled thermoplastic resin. As used herein, "substantially all" can mean at least 97%, alternatively at least 98%, alternatively at least 98.5%, alternatively at least 99%, alternatively at least 99.25%, alternatively at least 99.5%, alternatively at least 99.75%, alternatively at least 99.9%, and alternatively at least 99.99%.

The skin layers can contain thermoplastic material and an additional ingredient selected from the group consisting of pigment including effect pigment, toner, dye, porogens, and combinations thereof. The skin layers can contain from about 0.1% to about 6%, from about 0.3% to about 4%, and/or from about 0.5% to about 2%, by weight of the skin layers, additional material.

In some examples, the skin layers can include recycled thermoplastic material that can include a thermoplastic material and optionally impurities, as described herein. In some examples, substantially all the thermoplastic material in the skin layers is a recycled thermoplastic resin and in other examples substantially all the thermoplastic material in the skin layers is a mechanically recycled thermoplastic resin. The skin layers can contain from about 94% to about 99.9%, from about 96% to about 99.7%, from about from about 98% to about 99.5%, by weight of the skin layers, recycled thermoplastic material. The skin layers can contain from about 94% to about 99.9%, from about 96% to about 99.7%, from about from about 98% to about 99.5%, by weight of the skin layers, thermoplastic material. The thermoplastic material can be selected from the group including, but not limited to, virgin thermoplastic material, recycled thermoplastic material, and combinations thereof. The recycled thermoplastic material can include less than 2%, less than 1.5%, less than 1%, less than 0.5%, less than 0.25%, less than 0.1%, and less than 0.05%, by weight of the skin layers, impurities. The recycled thermoplastic material can include from about 0.01% to about 2%, from about 0.05% to about 1%, and/or from about 0.1% to about 0.75%, by weight of the skin layers, impurities.

The article can comprise greater than 20%, greater than 30%, greater than 35%, greater than 40%, greater than 45%, greater than 50%, greater than 60%, greater than 65%, greater than 70%, greater than 75%, greater than 80%, greater than 85%, greater than 90%, greater than 92%, greater than 94%, greater than 95%, by weight of the article, recycled thermoplastic material including chemically recycled material, mechanically recycled thermoplastic material, and combinations thereof. In one example, the skin layer(s) comprise less than 25%, less than 20%, less than 15%, less than 10%, less than 5%, by weight of the skin layer, mechanically recycled or chemically recycled thermoplastic material. In some examples, substantially all the thermoplastic resin used in the container is mechanically recycled thermoplastic resin. In other examples, the thermoplastic resin used in the container is recycled thermoplastic material that can include chemically recycled material and/or mechanically recycled thermoplastic material.

Not only do the articles described herein contain recycled thermoplastic material, which can include mechanically and/or chemical recycled material, but they also have improved aesthetics and improved structural integrity as compared to other articles containing recycled materials.

The article can have a relatively high gloss, as compared to other articles made from recycled thermoplastic material. At least 30%, at least 40%, at least 50%, at least 60%, at least 70%, at least 80%, at least 90%, and/or at least 95% of the area of the outer surface of the article can have a 20° gloss of greater than or equal to 65 GUs, greater than or equal to 68 GUs, greater than or equal to 70 GUs, greater than or equal to 71 GUs, greater than or equal to 73 GUs, greater than or equal to 75 GUs, greater than or equal to 80 GUs, greater than or equal to 85 GUs, greater than or equal to 90 GUs, and/or greater than or equal to 95 GUs. To determine the % of the area that has the 20° gloss specified in this paragraph, a vertical line is chosen across the sample (from the side that was originally closest to the shoulder to the side that was originally closest to the base), 10 measurements are taken according to the Gloss 20° Method, the measurements are equally spaced apart along the line, and it is confirmed how many of them have the required gloss units.

The article can have a location on the outer surface with a haze of ≤30, alternatively ≤20, alternatively ≤15, alternatively ≤10, alternatively ≤5, alternatively ≤3, and alternatively ≤2. The article can have a location on the outer surface can have a haze of from about 0 to about 30, alternatively about 0 to about 20, alternatively about 0.5 to about 15, alternatively about 0.8 to about 10, and alternatively about 1 to about 5. The haze can be determined by the Haze and Reflection Method, described hereafter.

The article can have a location on the outer surface with a haze anisotropy of ≤1, alternatively ≤0.9, alternatively ≤0.8, alternatively ≤0.7, and alternatively ≤0.6. The haze can be determined by the Haze and Reflection Method, described hereafter.

Furthermore, the articles described herein can be less susceptible to delamination as compared to other articles, including monolayer and multilayer articles containing recycled thermoplastic materials, particularly mechanically recycled thermoplastic material. Delamination is a constant problem in manufacturing blow molded multilayer hollow articles, such as bottles and containers. Delamination can occur immediately or over time due to the mechanical handling of the container, to thermal stress or mechanical stress. It manifests typically as bubbles (which is actually the separation of the two layers at the interface which can see by a bubble-like appearance) on the container surface but can also be at the origin of container failure. Without being bound by theory, we believe that the parallel flow co-injection, due to a prolonged contact of the materials of the various layers still in molten or partially molten state, leads to the formation of an interface region between the layers wherein the layers are slightly interpenetrated at an interface. The interface region generates a good adhesion between the layers and thus makes it much more difficult to separate them.

The presence and thickness of the interfaces between the skin layers and the core (also referred to as the tie layer) was determined by the Tie Layer Thickness Method, described hereafter. The thickness of the interface is the distance normal to the interface over which the composition of the unique pigment, additive or resin is changing between the maximum concentration and minimum concentration.

The thickness of the interfaces (i.e. the tie layer or transition layer or area of interpenetration) can be from about 500 nm to about 125 μm, alternatively 1 μm to about 100 μm, alternatively from about 3 μm to about 75 μm, alternatively from about 6 μm to about 60 μm, alternatively from about 10 μm to about 50 μm, as determined by the Tie Layer Thickness Method, described hereafter.

The articles can have a critical normal load of greater than or equal to 30 N, greater than or equal to 50N, greater than or equal to 60N, greater than or equal to 70N, greater than or equal to 80 N, greater than or equal to 90 N, greater than or equal to 95 N, greater than or equal to 100 N, greater than or equal to 104 N, greater than or equal to 105 N, greater than or equal to 110 N, and/or greater than or equal to 120 N. The articles can have a critical normal load of from about 30 N to about 170 N, alternatively from about 50 N to about 160 N, alternatively from about 60 N to about 155 N, alternatively from about 90 N to about 145 N, and alternatively from about 100 N to about 140 N. The critical normal load can be measured by the Critical Normal Load, using the method described hereafter.

As used herein, "article" refers to an individual blow molded hollow object for consumer usage, e.g. a container suitable for containing compositions. Non-limiting examples can include a bottle, a jar, a cup, a cap, a vial, a tottle, and the like. The article can be used in storage, packaging, transport/shipping, and/or for dispensing compositions container therein. Non-limiting volumes containable within the container are from about 10 mL to about 1000 mL, about 100 ml to about 900 mL, from about 200 mL to about 860 mL, from about 260 mL to about 760 mL, from about 280 mL to about 720 mL, from about 350 mL to about 500 mL. Alternatively, the container can have a volume up to 5 L or up to 20 L.

The compositions contained in the article may be any of a variety of compositions and including detergents (such as laundry or dishwashing detergents), fabric softeners and fragrance enhancers (such as Downy® Fresh Protect) food products including but not limited to liquid beverages and snacks, paper products (e.g., tissues, wipes), beauty care compositions (e.g., cosmetics, lotions, shampoos, conditioners, hair styling, deodorants and antiperspirants, and personal cleansing including washing, cleaning, cleansing, and/or exfoliating of the skin, including the face, hands, scalp, and body), oral care products (e.g., tooth paste, mouth wash, dental floss), medicines (antipyretics, analgesics, nasal decongestants, antihistamines, cough suppressants, supplements, anti-diarrheal, proton pump inhibitor and other heartburn remedies, anti-nausea, etc.) and the like. The compositions can include many forms, non-limiting examples of forms can include liquids, gels, powders, beads, solid bars, pacs (e.g. Tide PODS®), flakes, paste, tablets, capsules, ointments, filaments, fibers, and/or sheets (including paper sheets like toilet paper, facial tissues, and wipes).

The article can be a bottle for holding a product, for instance a liquid product like shampoo and/or conditioner and/or body wash.

As used herein, the term "blow molding" refers to a manufacturing process by which hollow thermoplastic articles containing cavities, suitable to accommodate compositions are formed. Generally, there are three main types of blow molding: extrusion blow molding (EBM), injection blow molding (IBM) and molding injection stretch blow molding (ISBM).

As used herein, the term "color" includes any color, such as, e.g., white, black, red, orange, yellow, green, blue, violet, brown, and/or any other color, or declinations thereof.

As used herein, "effect pigment" means one of two main classes of pigments" "metal effect pigments" and "special effect pigments." Metal effect pigments consist of metallic particles. They create a metal-like luster by reflection of light at the surface of the metal platelets when having parallel alignment in their application system. The incident light ray is fully reflected at the surface of the metal platelet without any transmitted component. When the metal platelets are well aligned and closely spaced, incident light rays can be fully reflected from the first several tens of microns from the surface. In blow molded articles, if the article contains metal platelets throughout its full thickness distribution, those distributed beyond the tens of microns near the surface do not have the opportunity to interact with incident light and therefore are not important for the optical response. Furthermore, metal effect pigments can be costly to manufacture, expensive to purchase, and can have an impact on recycle streams and environmental sustainability. A blow molded article with metal effect pigments confined to a thin layer where the remainder of article's thickness is free of or substantially free of metal effect pigments can be desirable in order to reduce the total amount of metal effect pigment used. Due to the high reflectivity and hiding strength of many metal effect pigments in combination with good alignment and spacing of the platelets, the color of the material behind the layer containing metal effect pigments is of less importance, therefore a variety of colored materials such as previously undesirable colors and discolored resins, including resins from one or more recycle streams.

Metal effect pigments often have a metal such as aluminum, copper, or bronze as the platelet substrate. The thickness, shape, and aspect ratio of the platelets can vary from thick and irregular shape often referred to as "cornflakes" to smoother pancake shaped "silver dollars" to ultrathin, flat and extremely high aspect ratio platelets. The "cornflakes" and "silver dollar" platelets are produced by a milling or atomization process whereas the ultrathin platelets are produced by physical vapor deposition. The metal platelets are often coated with additional materials to passivate the aluminum to make them stable for processing at thermoplastic processing conditions. Additionally, a variety of color effects may be achieved by coating with a dielectric material such as a metal oxide having specific refractive index and/or an absorbing species such as a dye or pigment linked to the surface. Commercial examples of metal effect pigments are Constant®, Grandal®, Luminor®, MultiFlect®, Zenexo® product lines from Schlenk Metallic Pigments GmbH and Mastersafe, STANDART®, and Stapa® from Eckart, a division of Altana.

Special effect pigments can include all other platelet-like effect pigments which cannot be classified as "metal effect pigments." These are typically based on a substrate which has platelet shaped crystals (or particles) such as mica, (natural or synthetic) borosilicate glass, alumina flakes, and/or silica flakes. These platelet shaped particles can be coated with metal oxides like titanium dioxide, iron oxide, silicon dioxide, tin oxide, and combinations thereof. Special effect pigments, including pearlescent pigments are marketed as such by suppliers including Merck® and BASF®.

Special effect pigments can be transparent/semi-transparent which are based on coating one or more layers onto a platelet substrate such as mica, silicon dioxide, borosilicate glass, alumina, or the like. The layers coating the platelet are often oxides like titanium dioxide, iron oxide, silicon dioxide, or combinations thereof. Effect pigments based on this structure can reflect a portion of the incident light while allowing the complementary portion of light spectrum to be transmitted through the coated platelet. The interference color effects due to reflected light from semi-transparent effect pigments can be best observed when viewed over a dark background since the background can absorb the transmitted complementary light spectrum along with any other incident light passing through or around the coated platelets. With a white or light background, the complementary transmitted light spectrum can diffusely scatter and reemerge to the observer, thus resulting in a less chromatic response.

In one example, effect pigments can be titanium dioxide coated onto mica platelets, which can achieve a silver pearl luster at a thickness of about 40-60 nm. When the titanium dioxide is a thicker layer, a series of interference colors can be achieved due to the refractive index difference between the layer and the mica platelet. For instance, as the titanium dioxide layer increases from about 60 to 160 nm, the interference colors progress from yellow to red to blue to green. Due to the nature of the pigments, the interference color can only be observed at a special angle relative to the observer, incident light and platelet surface. In other words, for special effect pigments based on titanium dioxide/mica having parallel alignment in their application system the interference color will appear a lustrous color near one angle, and transparent such that the surrounding material or background becomes apparent at other angles. The interference color effects due to reflected light from semi-transparent effect pigments are best observed when viewed over a dark background since the background can absorb the transmitted complementary light spectrum along with any other incident light. In this case, titanium dioxide/mica pigment with blue interference color would appear to flop between lustrous blue and black when the angle is changed. With a white background, the complementary transmitted light spectrum can diffusely scatter and reemerge to the observer, thus resulting in a less chromatic response. In this case, titanium dioxide/mica pigment with blue interference color would appear to flop between a less brilliant blue and pale yellow when the angle is changed. With a background of a different color, the background color can be hidden at the special angle, but apparent at other angles. In this case, a variety of flip-flop effects can be generated. In addition, curved surfaces can accentuate the appearance of the article, since both effects can be observed across the article at the same time.

Although a black background can improve the appearance of titanium dioxide/mica effect pigments, the interference color effects can be limited due to the inhomogeneous and impure nature of the mica used as the platelet substrate. Not wishing to be bound by theory, two general approaches have been used to improve upon the interference color effects of mica coated with a single layer of titanium dioxide (this structure is actually 3 layers—A/B/A, where B=mica, A=titanium dioxide). First, additional layers of alternating refractive index and suitable layer thicknesses can be added to the A/B/A structure such that the final structure has architecture of A/C/A/B/A/C/A where C=silicon dioxide, B=mica, and A=titanium dioxide. The additional interfaces created by the multilayered structure can contribute increased reflectivity and higher chroma versus a three-layer A/B/A structure. The second approach relies upon improving the quality of the substrate used to manufacture the effect pigment platelets. The thickness variation is relatively high for the mica platelets produced via commercial grinding and classification processes. Additionally, the mica platelets suffer from surface imperfections which can result in diffuse scattering. Natural mica also can contain iron impurities which impart a yellow mass tone to the effect pigment. Synthetic platelets based on borosilicate glass, alumina or silicon dioxide can improve the achievable color flop effects such as high chroma (color purity) and sparkle due to their smooth surfaces, uniform thickness, and no mass tone due to elemental impurities.

Color travel/goniochromatic effects are defined by the ability of the article to change color with angle of observation (i.e. green to purple, gold to purple, blue to violet, red to blue). Not wishing to be bound by theory, highly transparent special effect pigments which display color travel/goniochromatic effects can be generated a number of ways. In general, for most substrates including mica, borosilicate glass, alumina and silicon dioxide, increasing the number of layers to the base A/B/A structure can create color travel/goniochromatic effects if the layer thicknesses and refractive index differences are suitably chosen. A commercial example of this is the Firemist® Colormotion product line from BASF Corporation which relies on a 7-layer structure starting from a borosilicate platelet substrate followed by alternating $TiO_2/SiO_2/TiO_2$ on either side of the substrate. Alternatively, substrates such as silicon dioxide which are synthetically produced with uniform and controllable thickness can create color travel/goniochromatic effects with only a 3-layer A/B/A structure where $A=TiO_2$ and $B=SiO_2$. A commercial example of this is the Colorstream® product line from Merck KGaA (Darmstadt, Germany).

Effect pigments can have a particle size, in the longest dimension, from about 1 μm to about 200 μm, from about 2 μm to about 150 μm, from about 3 μm to about 100 μm, from about 4 μm to about 75 μm, and/or from about 5 μm to about 50 μm. The effect pigments can have a thickness less than 5 μm, less than 3 μm, less than 1 μm, less than 800 nm, less than 700 nm, and/or less than 600 nm. The effect pigments can have a thickness from about 25 nm to about 5 μm, from about 100 nm to about 3 μm, from about 150 nm to about 1 μm, from about 200 nm to about 700 nm, from about 250 nm to about 600 nm, and/or from about 300 nm to about 560 nm. The dimensions of the effect pigments can be determined by the Platelet Dimensions Test Method, described hereafter.

The effect pigments can have a relatively high aspect ratio (i.e. the ratio of the major axis divided by the minor axis). For example, the aspect ratio can be greater than 1:1, greater than 5:1, greater than 10:1, greater than 15:1, greater than 20:1, greater than 30:1, greater than 40:1, greater than 60:1, greater than 80:1, and/or greater than 100:1.

The material making up of any one or more of the layers of the preform and/or article may include one or more effect pigments or other materials such as porogens, including, but not limited to the microdomain-forming liquids, microdomain-forming solids, microvoid-forming solids, and blowing agents described herein. As used herein the term "porogen" refers to a material which may cause gas-filled or vapor-filled microdomains or micropores to occur in a polymer matrix. Examples of porogens include porous solid particles which retain at least some of their porosity during processing to form a container. Other porogens include solid particles which at least partially separate from the matrix upon stretching of a thermoplastic material, resulting in micropore formation. Examples of such solid particles include calcium carbonate particles which may be coated with a fatty acid or salt(s) thereof. Porogens also include blowing agents which may vaporize or evolve gas to form micropores. Such materials may be added to provide a number of different visual effects in the preform and/or finished article, such as, for example, pearlescence, sparkle, reflection, color change, etc. Surprisingly, however, as described in more detail herein, it has been found that when combined with etching, texturing or otherwise modifying the outer surface of the preform, the inclusion of effect pigments and/or porogens can provide unique aesthetic characteristics in the final article. For example, the article can be provided with unique aesthetic features having the appearance of depth, texture, and/or three-dimensions. And, except for the novel features and methods described herein, these aesthetic characteristics can be provided with conventional blow molding equipment and techniques. Further, these unique aesthetics characteristics can be provided in articles with smooth, relatively smooth, or substantially smooth outer surfaces, which can be a benefit in and of itself. Having a smooth, relatively smooth, or substantially smooth outer surface may be desirable for many reasons, including because it can allow for easier printing of the outer surface, easier labeling, easier handling, better tactile feel, and other benefits.

The preform may comprise from about 0.01%, to about 5.0%, from about 0.05% to about 1.5%, and/or from about 0.1% to about 0.5%, of a microdomain-forming liquid. Without being bound by theory, the liquid is believed to be finely dispersed in the thermoplastic material due to the high shear conditions during compounding of the masterbatch and/or injection molding of the pre-form. Because the liquid is immiscible with the thermoplastic material, it forms finely dispersed droplets or phase-separated microdomains within the thermoplastic material. To minimize interfacial energy, the microdomains tend to be spherical in shape when formed. However, during the injection and blow molding processes, the microdomains may change shape. If the thermoplastic material undergoes uniaxial shear or stretch in a particular zone or region, the microdomains may become rod-like, sausage-shaped or ellipsoidal in that region or zone. If the thermoplastic material undergoes biaxial stretch in a particular zone or region, then the microdomains may become disc-shaped or plate-like in that region or zone. These and different shapes may be formed depending on the nature of the extension or stretching of the thermoplastic material. Different fluid-containing microdomain shapes may be disposed in different regions or zones within the preform or article.

Microdomain-forming liquids may comprise silicone oils, hydrocarbon oils, liquid polyfluorinated compounds, liquid oligomers, polyalkylene oxides, ethylene glycol, propylene glycol water, ionic liquids, and mixtures thereof. Some or all of the molecules of the microdomain forming liquid may be linear, cyclic or branched. Some or all of the molecules of the microdomain-forming liquid may contain functional groups. Examples of such functional groups include ester, ether, amine, phenyl, hydroxyl, carboxylic acid, vinyl, and halogen groups. A molecule may contain one or more functional groups and a microdomain-forming liquid may comprise molecules with different functional groups. Specific examples of microdomain-forming liquids include linear, branched and cyclic polydimethyl siloxane or other polydialkyl or polydiaryl siloxanes. Suitable siloxane liquids include linear or branched polydimethylsiloxane homopolymers. Hydrocarbon oils include mineral oils (C15-C40) or liquid paraffins. Polyfluorinated compounds include perfluorocarbon compounds such as perflouorooctane as well as fluoropolyethers such as Fomblin® oil. Liquid oligomers include low molecular weight hydrocarbon compounds such as polyisoprene or polyisobutylene. Other liquid oligomers include polyalkylene glycols such as low molecular weight polyethylene glycol. An example thermoplastic material is polyethylene terephthalate (PET), and an exemplary microdomain-forming liquid is hydroxyl-terminated polydimethylsiloxane.

The preform may comprise from about 0.10%, to about 20%, preferably from about 1.0% to about 10%, and more preferably from about 1.0% to about 5.0%, of a microdomain-forming solid material or microvoid-forming solid material. The material is dispersed within a thermoplastic material in the form of small solid particles, the particles typically having a number-average largest dimension of about 1 micron or less. The particles may comprise inorganic material such as calcium carbonate, or organic material such as poly (methyl methacrylate). Without being bound by theory, the microvoid-forming solid particles are believed to be finely dispersed in the thermoplastic material due to the high shear conditions during compounding of the masterbatch and/or injection molding of the pre-form. The solid material may melt during compounding of the materbatch to form liquid droplets but re-solidifies upon cooling to 25° C. to form phase-separated finely-dispersed solid particles within the thermoplastic material.

It is believed that microvoid-forming solids, upon stretching of the thermoplastic material, e.g. during the blow molding process, at least partially detach from the thermoplastic material matrix to form discrete microvoids within the thermoplastic material. A microvoid, as used herein, can encompass both the gas-filled microvoid and any solid microvoid-forming particle(s) therein. The microvoid-forming solid particles may be treated or coated to facilitate detachment from the thermoplastic polymer matrix upon stretching. For example, the particles may be at least partially coated with a relatively thin layer of a fatty acid or salt thereof such as stearic acid or calcium stearate. Examples of other treatments or coating materials include fluoro compounds and silicone compounds. Examples of inorganic microvoid-forming solid particles include calcium carbonate, silica (including ground, precipitated and/or fumed silica), alumina, titania, clays, barium sulfate, and the like, and mixtures thereof. Examples of organic or organosilicon microvoid-forming solid particles include polysiloxane waxes, hydrocarbon waxes, polyalkylene oxide waxes, polystyrene, polyesters such as polycarbonate, polyolefins, poly (meth) acrylates, polymethylpentene, liquid crystalline polymer (LCP), and other solid or waxy polymers, and mixtures thereof. An exemplary embodiment includes a microvoid-forming solid is calcium carbonate in a polyethylene terephthalate (PET).

Microdomain-forming solids, different than microvoid-forming solids, are believed to soften during the blow molding process. As such, they tend not to detach from thermoplastic polymer matrix in which they are imbedded and do not create microvoids. Examples of microdomain-forming solids include, but are not limited to elastomers and other cross-linked polymers and PET.

The preform may comprise from about 0.01%, to about 5.0%, preferably from about 0.05% to about 1.5%, and more preferably from about 0.1% to about 0.5%, of a microvoid-forming blowing agent. Blowing agents may be solid or liquid under ambient conditions. Without being bound by theory, blowing agents are believed to become finely dispersed or dissolved in the thermoplastic material due to the high pressure and high shear conditions during compounding of the masterbatch and/or injection molding of the pre-form. Blowing agents may be miscible or immiscible with the thermoplastic material. Upon a triggering event such as heating, pressure reduction, or change in pH, the blowing agent evolves vapor or gas to form a microvoid within the thermoplastic material matrix. The microvoids tend to be spherical in shape when formed. However, during the blow molding process, the microvoids may change shape. If the thermoplastic material undergoes uniaxial stretch in a particular zone or region, the microvoids may become rod-like, sausage-shaped or ellipsoidal in that region or zone. If the thermoplastic material undergoes biaxial stretch in a particular zone or region, the microvoids may become disc-shaped or plate-like in that region or zone. Different shapes may be formed depending on the nature of the extension or stretching of the thermoplastic material and a preform and/or article may have different fluid-containing microvoid shapes in different regions or zones.

Blowing agents may comprise compounds such as pentane or hexane which are volatile liquids under ambient conditions, but which boil or vaporize under process conditions which may include increased temperature and/or reduced pressure. Alternatively, bowing agents may be solids under ambient conditions but evolve vapor or gas when heated or subjected to other triggering events. Examples of such materials include pentane, sodium bicarbonate, azo compounds such as azobisisobutyronitrile, peroxy compounds such as dibenzoyl peroxide, and the like.

The effect pigment, microdomain-forming material, microvoid-forming solid and microvoid-forming blowing agent may include or form platelet-like shaped particles or regions (hereinafter "effect structures") in one or more of the layers of the preform. Additional information on porogens including microdomain-forming liquids, microdomain-forming solids, microvoid-forming solid and microvoid-forming blowing agent can be found in U.S. application Ser. No. 16/720,052, incorporated by reference.

As used herein, "opaque" means that layer or wall has total luminous transmittance of less than 50%. The total luminous transmittance is measured in accordance with the Total Luminous Transmittance test method described hereafter.

As used herein, "preform" is a unit that has been subjected to preliminary, usually incomplete, shaping or molding, and is normally further processed to form an article. The preform is usually approximately "test-tube" shaped.

As used herein, "substantially free" means less than 3%, alternatively less than 2%, alternatively less than 1%, alternatively less than 0.5%, alternatively less than 0.25%, alternatively less than 0.1%, alternatively less than 0.05%, alternatively less than 0.01%, alternatively less than 0.001%, and/or alternatively free of. As used herein, "free of" means 0%.

As used herein, the terms "include," "includes," and "including," are meant to be non-limiting and are understood to mean "comprise," "comprises," and "comprising," respectively.

All percentages, parts and ratios are based upon the total weight of the compositions of the present invention, unless otherwise specified. All such weights as they pertain to listed ingredients are based on the active level and, therefore, do not include carriers or by-products that may be included in commercially available materials.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Where amount ranges are given, these are to be understood as being the total amount of said ingredient in the composition, or where more than one species fall within the scope of the ingredient definition, the total amount of all ingredients fitting that definition, in the composition. The article can have a total luminous transmittance of 50% or less, alternatively 40% or less, alternatively 30% or less, alternatively 20% or less, alternatively 10% or less, and alternatively 0% or less. The total luminous transmittance can be from about 0% to about 50%, alternatively from about 0% to about 40%, alternatively from about 0% to about 30%, alternatively from about 0% to about 20%, and alternatively from about 0% to about 10%. as measured in accordance with the Total Luminous Transmittance Test Method described hereafter.

The core layer can have a total luminous transmittance of less than or equal to 50%, alternatively less than or equal to 40%, alternatively less than or equal to 30%, alternatively less than or equal to 20%, alternatively less than or equal to 10%, alternatively less than or equal to 5% as measured in accordance with Total Luminous Transmittance Test Method described hereafter.

The core layer can have a dark or black color with a L* of less than or equal to 80, less than or equal to 70, less than or equal to 60, less than or equal to 50, alternatively less than or equal to 40, alternatively less than or equal to 30, alternatively less than or equal to 20, alternatively less than or equal to 10, alternatively less than or equal to 5. The core can have an L* of from about 0 to about 80, of from about 0 to about 75, of from about 0 to about 65, of from about 0 to about 55, of from about 0 to about 50, of from about 0 to about 45, and/or of from about 0 to about 40. In some examples, an effect pigment, in particular a special effect pigment, can be used that can provide a goniochromatic effect (i.e. where the bottle has a color shift that is angular dependent).

Figure 3:
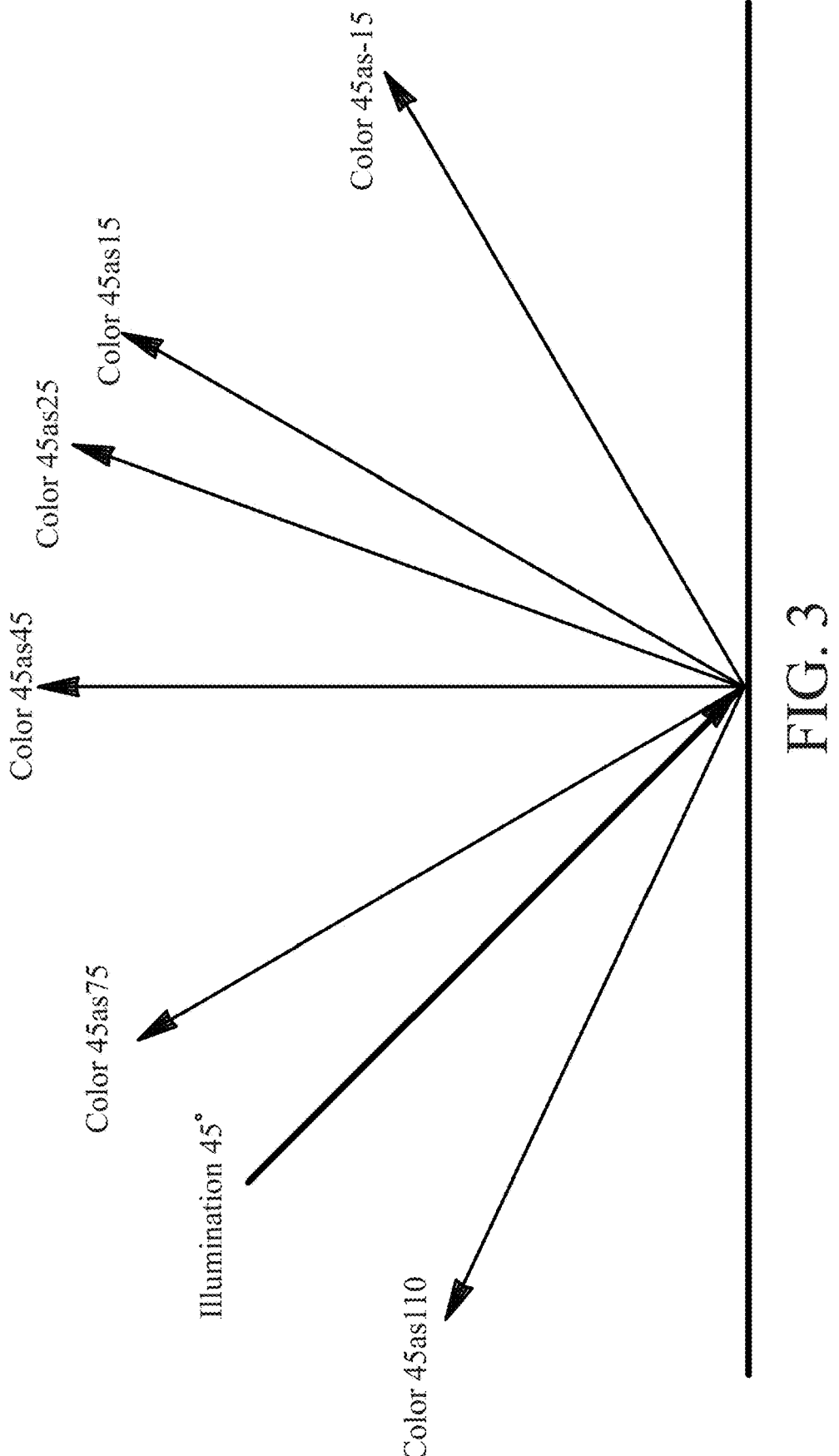
FIG. 3 describes the measurement naming system used to determine the $\Delta E$, a*, b*, C*, and h° at different viewing angles when illuminated at $45°$.

The magnitude of the color flop can be determined by calculating the color change, ΔE*, for the same region but between two difference detection angles such as between a steep and shallow angle of observation at (Color45as45 and Color45as-15). The greater the magnitude, the more color shift across the bottle. The measurement naming system used here is written where the first angle provided is the illumination angle as defined from the surface normal and the second angle is the aspecular detection angle. This is further described in FIG. 3.

ΔE* is mathematically expressed by the equation:

$$\Delta E^* = [(L^*_x - L^*_Y)^2 + (a^*_x - a^*_Y)^2 + (b^*_x - b^*_Y)^2]^{1/2}$$

'X' represents a first measurement point (e.g. Color45as45) and "Y" represents a second measurement point (e.g. Color45as-15).

Using illumination at 45°, ΔE*–15° vs 45° for a multilayer structure can be greater than 20, greater than 30 greater than 40, greater than 50, greater than 60, greater than 75, greater than 80, greater than 85, greater than 90, greater than 95, greater than 100, and/or greater than 105. ΔE*–15° vs 45° for a multilayer structure can be from about 25 to about 150, from about 35 to about 145, from about 45 to about 140, from about 50 to about 135, from about 55 to about 130, about 60 to about 130, from about 75 to about 130, from about 90 to about 125, from about 95 to about 130, from about 100 to about 125, and/or from about 105 to about 120.

The ΔL* is the difference between the max and min for the following six angles: Color45as-15, Color45as15, Color45as25, Color45as45, Color45as75, and Color45as110. The ΔL* for a multilayer structure can be greater than 45, greater than 50, greater than 55, greater than 60, greater than 65, and/or greater than 70. The ΔL* for a multilayer structure can from about 10 to about 100, about 25 to about 90, about 40 to about 85, and/or about 50 to about 80.

The mean C* is the mean chroma for the following six angles: Color45as-15, Color45as15, Color45as25, Color45as45, Color45as75, and Color45as110. The mean *C for a multilayer structure can be greater than 10, greater than 15, greater than 20, greater than 25, and/or greater than 30. The mean *C for a multilayer structure can be from about 10 to about 50, from about 15 to about 45, from about 20 to about 40, and/or from about 25 to about 35.

The ΔE*, ΔL*, mean C* for a multilayer structure with a core comprising mechanically recycled polymeric material can be within about 6 units, within about 5 units, within about 4 units, within about 3 units, within about 2 units, and/or within about 1 unit as a multilayer structure with similar construction, except the core comprises virgin thermoplastic material instead of mechanically recycled polymeric material.

Another problem with working with recycled thermoplastic material, especially mechanically recycled thermoplastic material including PET, is that different feedstocks may not have uniform color, causing the articles to look different when they are in an array on the store shelf. Noticeable variation can make products look cheap and unattractive, which is unacceptable to a consumer buying beauty products. The articles described herein can include an array of two or more articles that can have a ΔE*, ΔL*, mean C*, gloss, and haze that may vary but the variation is not would not be visually perceptible to a viewer. The ΔE*, ΔL*, mean C* across each article in the array varies by less than 6 units, less than 5 units, less than 4 units, less than 3 units, less than 2 units, and/or less than 1 unit across the array. The ΔE*, ΔL*, mean C* as measured on the outer wall of the bottle across the array varies by less than 10%, less than 7%, less than 5%, less than 3%, less than 2%, and/or less than 1% across the array. By "visually perceptible" is meant that a human viewer can visually discern the debossed element with the unaided eye (excepting standard corrective lenses adapted to compensate for near-sightedness, farsightedness, or stigmatism, or other corrected vision) in lighting at least equal to the illumination of a standard 100-watt incandescent white light bulb at a distance of 1 meter.

The average panel wall thickness can be from about 200 μm to about 5 mm, alternatively from about 250 μm to about 2.5 mm, alternatively from about 300 μm to about 2 mm, alternatively from about 350 μm to about 1.5 mm, alternatively from about 375 μm to about 1.4 mm, and alternatively from about 400 μm to about 1 mm. The average panel wall thickness can be determined using the Local Wall Thickness method, described hereafter. The average local wall thickness can vary by less than 20% across the volume, alternatively less than 15%, alternatively less than 10%, and alternatively less than 10%.

The layer thickness of the skin layer comprising the outer surface and/or the skin layer comprising the inner surface and/or the core can be from about 50 μm to about 800 μm, alternatively from about 75 μm to about 600 μm, alternatively 85 μm to about 500 μm, alternatively 100 μm to about 450 μm, and alternatively from about 120 μm to about 250 μm.

The skin layer comprising the outer surface of the article can be thicker than the other layers, including the skin layer comprising the inner surface of the article. The skin layer comprising the outer surface can be 10% greater than the skin layer comprising the inner surface, 20% greater, 25% greater, 30% greater, 40% greater, and/or 50% greater. The skin layer comprising the outer surface can be twice the thickness of the skin layer comprising the inner surface, three times greater, four times greater, and/or five times greater. The thickness of the layers can be determined using the Layer Thickness Method, described herein.

The average panel wall thickness can comprise from about 30% to about 80% core, from about 35% to about 75% core, from about 40% to about 70% core, from about 45% to about 65% core, and/or from about 50% to about 60% core. The average panel wall thickness can comprise greater than 33% core, greater than 40% core, greater than 45% core, greater than 50% core, greater than 55% core, and/or greater than 60% core.

The article can feel smooth and can have a location with a Root Mean Square Roughness, Sq, of less than 50 μin (1.27 μm), less than 45 μin (1.12 μm), less than 40 μin (1.016 μm), less than 35 μin (0.89 μm), and/or less than 32 μin (0.8128 μm). The article can have a Root Mean Square Roughness, Sq, from about 20 μin (0.508 μm) to about 42 μin (1.0668 μm), from about 25 μin (0.635 μm) to about 40 μin (1.016 μm), from about 28 μin (0.7112 μm) to about 38 μin (0.9652 μm), and/or from about 30 μin (0.762 μm) to about 36 μin (0.9144 μm). The Root Mean Square Roughness, Sq, can be measured by the Root Mean Square Roughness, Sq, Measurement Method, as described hereafter.

The article can contain thermoplastic material, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP), polymethylpentene (PMP), liquid crystalline polymer (LCP), cyclic olefin copolymer (COC), and a combination thereof. The thermoplastic material can be selected from the group consisting of PET, HDPE, LDPE, PP, PVC, PETG, PEN, PS, and combinations thereof. The thermoplastic material can be selected from the group consisting of PET, PP, HDPE, LDPE, and combinations thereof. In one example, the thermoplastic material can be PET.

Recycled thermoplastic materials may also be used, e.g., post-consumer recycled ("PCR") materials, post-industrial recycled ("PIR") materials and regrind materials, such as, for example polyethylene terephthalate (PCRPET), high density polyethylene (PCRHDPE), low density polyethylene (PCRLDPE), polyethylene terephthalate (PIRPET) high density polyethylene (PIRHDPE), regrind polyethylene terephthalate, low density polyethylene (PIRLDPE) and others.

The thermoplastic materials described herein may be formed by using a combination of monomers or oligomers derived from renewable resources and monomers derived from non-renewable (e.g., petroleum) resources. For example, the thermoplastic material may comprise polymers made from bio-derived monomers or oligomers in whole, comprise polymers partly made from bio-derived monomers or oligomers and partly made from petroleum-derived monomers or oligomers, or could be derived from enzymatic derived approaches too.

The core layer and the skin layers can comprise the same or different thermoplastic materials. The skin layers and core layer can be based on the same type of thermoplastic material (e.g. PET), this can allow a better interpenetration of the layers at the interface due to their chemical compatibility and a more robust wall. For "based on the same type of resin" it is meant that the skin layers and core layers can contain at least 50%, at least 70%, at least 90%, and/or at least 95% of the same type of resin. For "same type" of resin it is intended resin from the same chemical class i.e. PET is considered a single chemical class. For example, two different PET resins with different molecular weight are considered to be of the same type. However, one PET and one PP resin are NOT considered of the same type. Different polyesters are also not considered of the same type.

The skin layers and core can comprise similar resins such as identical grades of PET, dissimilar grades of PET, or virgin PET/recycled PET (rPET). The use of rPET is desirable due to potentially decreased cost and sustainability reasons. The skin and core layers can also comprise different resins which can alternate within the article such as PET/ cyclic olefin copolymer, PET/PEN, or PET/LCP. The resin pair is chosen to have optimal properties such as appearance, mechanical, and gas and/or vapor barrier.

The article can comprise at least three layers in one or multiple regions. The region(s) formed by the three layers can comprise more than about 60%, more than about 80%, more preferably more than 90%, and/or more than 95%, of the article weight. The region(s) formed by the three layers (referred to herein as two skin layers and a core) can comprise substantially the entire length of the article and/or the entire length of the article.

The articles can comprise one or more sub-layers with various functionalities. For instance, an article may have a barrier material sub-layer or a recycled material sub-layer between an outer thermoplastic layer and an inner thermoplastic layer. Such layered containers can be made from multiple layer preforms according to common technologies used in the thermoplastic manufacturing field. Barrier material sub-layers and recycled material sublayers can be used in the core layer and/or an additional C-layer. In one example, the article wall can comprise an inner surface comprising a skin layer, adjacent to this skin layer can be a core, adjacent to the core can be a C-layer, adjacent the C-layer can be another core, and adjacent to the core can be skin layer comprising an outer surface.

The article can contain, in any of its layers as long as the required properties of the layer are maintained, additives typically in an amount of from about 0.0001% to about 9%, from about 0.001% to about 5%, and/or from about 0.01% to about 1%, by weight of the article. Non-limiting examples of the additives can include filler, cure agent, anti-statics, lubricant, UV stabilizer, antioxidant, anti-block agent, catalyst stabilizer, nucleating agent, and a combination thereof.

The core and/or the skin layers can contain opacifying pigments. Opacifying pigments can include opacifiers, opaque absorption pigments, and combinations thereof. The skin layer comprising the outer surface of the article can be free of or substantially free of opacifying pigments to avoid diminishing the effect of the effect pigments.

Non-limiting examples of opacifiers can include titanium dioxide, calcium carbonate, silica, mica, clays, minerals and combinations thereof. Opacifiers can be any domain/particle with suitably different refractive index from the Thermoplastic materials (e.g. PET, which can include poly(methyl methacrylate), silicone, liquid crystalline polymer (LCP), polymethylpentene (PMP), air, gases, etc.). Additionally, opacifiers can have the appearance of being white due to scattering of light or black due to absorption of light as well as shades in between as long as they block the majority of light from being transmitted to the layer underneath. Non-limiting examples of black opacifying pigments include carbon black and organic black pigments such as Paliogen® Black L 0086 (BASF).

Opaque absorption pigments can include particles that provide color and opacity to the material in which they are present. Opaque absorption pigments can be inorganic or organic particulate materials. All absorption pigments can be opaque if their average particle size is sufficiently large or if they possess high extinction coefficient. The particle size of absorption pigment is typically larger than 15 nm, alternatively larger than 100 nm, alternatively larger than 500 nm, and alternatively larger than 1 micrometer. Absorption pigments can be organic pigments and/or inorganic pigments. Non-limiting examples of organic absorption pigments can include azo and diazo pigments such as azo and diazo lake, Hansa, benzimidazolones, diarylides, pyrazolones, yellows and reds; polycyclic pigments such as phthalocyanines, quinacridones, perylenes, perinones, dioxazines, anthraquinones, isoindolins, thioindigo, diaryl or quinophthalone pigment, Aniline Black, and combinations thereof. Non-limiting examples of inorganic pigments can include titanium yellow, iron oxide, ultramarine blue, cobalt blue, chromic oxide green, Lead Yellow, cadmium yellow and cadmium red, carbon black pigments, mixed metal oxides, and combinations thereof. The organic and inorganic pigments can be used singly or in combination.

Another aspect the present invention relates to a hollow preform which can be blow molded to make an article as described above. A hollow preform can include a wall wherein the wall has an inside surface and an outside surface, the preform wall being formed in at least one region by three layers, two preform skin layers that include the inside surface of the wall region and the outside surface of the wall region and a preform core layer located between the two preform skin layers. These three layers together make up the entire wall of the preform in that region.

The preform can be made by parallel coinjection of two or more streams and wherein one or more streams make up layer the skin layers and the remaining streams make up the core layer, wherein the skin layers include the effect pigment and a thermoplastic material and the core layer can include recycled thermoplastic material and pigments.

The two uniformed streams of hot polymer melt join at the injector nozzle(s) prior to entering the mold cavity and this starts the multi-stream co-joined flow. The injectors can be arranged in a number of different ways including the arrangements shown in FIGS. 4A-C.

When the article is a container or a bottle, the critical normal load, opacity, and goniospectrophotometry measurements were all performed on a panel wall sample that was removed from the article. Unless stated, the outside surface of the panel wall sample is tested. Samples with dimensions of 100 mm in length and about 50 mm in width are cut out from the main portion of the article wall and at last least 50 mm away from shoulder/neck and base regions.

Figures 4A, 4B, 4C:
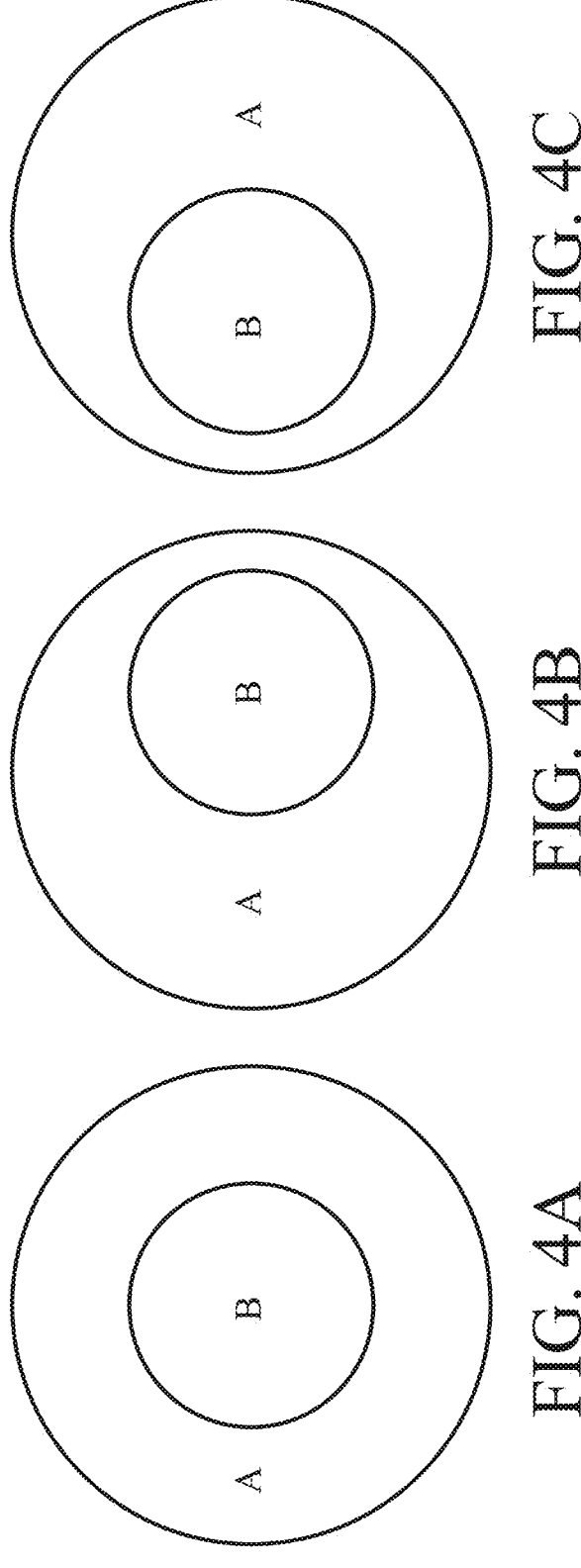
FIG. 4A is a schematic of an injector arrangement where the nozzles are concentric.
FIG. 4B is a schematic cross-section of an injector arrangement that are off-centered.
FIG. 4C is a schematic cross-section of an injector arrangement that are off-centered.

Different nozzle arrangements can result in different flow patterns of streams I and II. FIGS. 4B and 4C show an injector nozzles A and B that are off-centered (non-concentric or biased). The outer nozzle A can dispense stream I and the inner nozzle B can dispense stream II. In FIG. 4B, the placement of the injector nozzle A can enable a thicker skin layer that comprises the outer surface of the bottle, which comprises the outer surface of the article. In FIG. 3C, the placement of the injector nozzle A can enable a thinner skin layer that comprises the outer surface of the bottle and a thicker skin layer, which comprises the inner surface of the article. To obtain this stream pattern, several methods can be utilized. Processes with non-concentric nozzles require the center nozzle to be positioned off-center, while processes with valve pin plates would adjust the profile creating the offset preferential flow. The biased position in FIG. 4B can allow for more A material to flow to the outside of the preform, which can result in improved visual effects of the article, in particular improved appearance of the debossed element.

As apparent to a skilled person, such a preform once blow molded will form an article according to the invention having skin and core layers, wherein the layers of the preform will form the corresponding layers of the article i.e. the preform skin layers will form the skin layers of the article and the preform core layer will form the core layer of the article.

A preform suitable for blow molding can be formed by the following steps:
  a) providing a co-injection mold for making a preform
  b) co-injecting at essentially the same time (parallel co-injection) two or more streams of molten resin thus forming a complete preform as described above, wherein one or more streams make the preform skin layers with effect pigments and an opaque preform core layer; optionally additional streams can be added forming one or more C-layers.

A preform obtained with this method can be subsequently blow molded by IBM or ISBM, in particular the articles can be made according to ISBM. Articles made using ISBM process (as well as their respective preforms made via injection molding) can be distinguished from similar articles made using different process e.g. extrusion blow molding, for the presence of a gate mark, i.e. a small raised dot which indicates the "gate" where the injection took place. Typically, in the case of container and bottles, the "gate mark" is present at the bottom of the article.

TEST METHODS

When the article is a container or a bottle, the critical normal load, opacity, and goniospectrophotometry measurements were all performed on a panel wall sample that was removed from the article. Unless stated, the outside surface of the panel wall sample is tested. Samples with dimensions of 100 mm in length and about 50 mm in width are cut out from the main portion of the article wall and at last 50 mm away from shoulder/neck and base regions.

When the article does not allow taking a sample this large, shorter samples in scale 1:2 width:length may be used as detailed further below. For containers and bottles, the sample is preferably removed from the label panel of the bottle at least 50 mm away from shoulder/neck or base regions. The cutting is done with a suitable razor blade or utility knife such that a larger region is removed, then cut further down to suitable size with a new single edge razor blade.

The samples should be flat if possible or made flat by using a frame maintaining the sample flat at least in the region where the test is done. It is important that the sample is flat to determine the Critical Normal Load, Root Mean Square Roughness, Sq, total luminous transmittance, and goniospectrophotometry.

Average Normal Orientation and Local Orientation Index:

The methods set forth herein describe how to measure the normal orientation of effect structures disposed within a layer of material as well as the Average Normal Orientation of effect structures in a defined region and the LOI of a particular sample. To help better understand the methods, a brief summary is set forth here and then a specific example is disclosed.

Before determining the Average Normal Orientation of any group of effect structures or the LOI of any portion of an article, it is important to identify the particular regions of the article that will be measured and the effect structures within the measured region that will be analyzed. Thus, article 100, such as bottle 180 shown in FIG. 15 is visually inspected by a human having 20/20 vision (or the equivalent due to correction by glasses, contact lenses or surgery) to find a location on the wall sample from the wall 150 of the bottle 180. The location chosen should be located so as not to completely overlap the neck 103, first shoulder 101, second shoulder 102 or base 106 of the bottle 180, and if possible, not overlap at all with any of such portions or other irregularities in the outer surface 133 of the bottle 180. The sample portion 500 should be generally rectangular in shape. The sample portion 500 should be carefully removed from the bottle 180 such that it is not deformed or damaged and so that it can be further cut into the specific sample size, such as sample 505 shown in FIG. 16, to be analyzed.

Once the sample 505 is obtained, it is scanned with a Computed Tomography (CT) system (equipped with a microscope, as needed) at a sufficient resolution to characterize the shape of the effect structures 300 therein. The x-ray energy and contrast mode of the CT is set to optimize the signal due to the effect structures 300 versus the signal from the material making up the wall 150 of the article 100 (e.g. plastic or polymeric material). Because the CT data may contain "noise" or "artifacts" and the sample 505 may contain secondary pigmentation or additives based on isotropic particles (for example, traditional pigments and/or reheat additives), to enable identification of an effect structure 300, it is first important to characterize the general shape parameters of the effect structures 300. The shape parameters of the effect structures 300 may be obtained from the CT data, but the parameters may be supplemented by or obtained from the manufacturer's specifications or other imaging systems and methods.

After the shape parameters of the effect structures 300 are known, the orientation of the effect structures 300 within the sample 505 can be determined. The orientation information can be obtained from a CT scan taken of the sample 505. The CT scan can be the same as that which is used to characterize the shape of the effect structures 300 or a separate scan used only to determine the effect structure 300 orientation. Starting with the sample 505, a measurement area 510 is identified that extends across the boundary 515 of the visual effect 360 and the portion of the sample 505 that does not include the visual effect 360. The sample's CT scan data is segmented, using an intensity threshold, into 3D voxel blobs which will be considered candidates for the effect structures 300. The previously determined shape parameters are then used to refine the voxel blobs, such as to separate voxel blobs representing effect structures 360 from voxel blobs that were caused by noise, artifacts, etc. An effect structure normal vector ESNV (as shown in FIG. 17) is calculated for each effect structure 360 and is compared in the plane perpendicular to the boundary 515 (or perpendicular to the tangent of the boundary at the center of the boundary 515 in the sample) of the visual effect 360 to an outer surface normal vector OSNV of the outer surface 133 of the article 100. If the angle between the ESNV and OSNV is obtuse, the direction of the ESNV should be reversed making the measured angle acute. The OSNV at a surface point of the article should be extended towards the effect structure 300 until it intersects an effect structure 300 with an ESNV. The acute angle between the ESNV and OSNV is recorded for that point.

Averaging the acute angles between the ESNV and OSNV within this square area provides an Average Normal Orientation for the effect structures for the location analyzed.

Critical Normal Load (N) and Scratch Depth at Region of Failure

If the sample readily delaminates upon removal from the bottle, the sample is given a score of 0 N for the "Critical Normal Load." For samples which remain intact, they are subjected to scratch-induced damage using a Scratch 5 from Surface Machine Systems, LLC according to Scratch Test Procedures (ASTM D7027-13/ISO 19252:08) using a 1 mm diameter spherical tip, Initial Load: 1 N, End Load: 125 N, Scratch Rate: 10 mm/s, and Scratch Length of 100 mm. For samples smaller than 100 mm, the Scratch Length can be decreased while keeping the initial and end loads the same. This provides an estimate of the Critical Normal Load. Using this estimate, additional samples can be run over a narrower load range to provide more accurate determination of the Critical Normal Load.

Scratch-induced damage is performed on both sides of the sample corresponding to the inner and outer surface of the bottle. It is critical that the sample is affixed to the sample stage by the use of foam-based double-sided tape such as Scotch® Permanent Mounting Tape by 3M (polyurethane double-sided high-density foam tape with acrylic adhesive having a total thickness of about 62 mils or 1.6 mm, UPC #021200013393) on the underside of the sample. All samples are cleaned with compressed air before the scratch test.

The Point of Failure is visually determined after completing the scratch test as the distance across the length of the scratch at which the onset of visible delamination occurs. Delamination introduces an air gap between layers which is visible to the naked eye or with assistance of a stereomicroscope by one skilled in the art. as. This is validated based on a minimum three scratches per each side of the sample (defined as the cut out from bottle above) with a standard deviation of 10% or less. The side with lower Critical Normal Load is reported as the result of this method. The Scratch Depth at Region of Failure is measured according to ASTM D7027 across the scratch location at the point which the onset of delamination occurs. The Critical Normal Load (N) is defined as the normal load recorded at the location determined to be the Point of Failure. A Laser Scanning Confocal Microscope (KEYENCE VK-9700K) and VK-X200 Analyzer Software is used to analyze scratch-induced damage including the Point of Failure, Scratch Width, and Scratch Depth.

Gloss 20° Method

Gloss 20° is measured with a gloss meter such as the micro-TRI-gloss (BYK-Gardner GmbH) at 20° according to ASTM D2457-13. Each point is measured three times and the mean is calculated to determine the gloss 20°. All gloss measurements were done over black background which we refer to as "Base Black." Base Black is the black area from the X-Rite Grey Scale Balance Card (45as45 L*a*b* 21.077 0.15-0.29). The measurements provided by the Micro-Tri Gloss meter have the unit "GU" which stands for "gloss units."

The minimal measuring area for Gloss 20° with the micro-TRI-gloss is 10×10 mm

Goniospectrophotometry $\Delta E^*$ is mathematically expressed by the equation:

$$\Delta E^* = [(L^*_{X} - L^*_{Y})^2 + (a^*_{X} - a^*_{Y})^2 + (b^*_{X} - b^*_{Y})^2]^{1/2}$$

'X' represents a first measurement point (e.g. Color45as45) and "Y" represents a second measurement point (e.g. Color45as-15).

Reflected color characteristics of L*, a*, b*, C* and h° are measured using a Multi-Angle Spectrophotometer such as the MA-T12 or MA98 from X-Rite Incorporated in accordance with ASTM E 308, ASTM E 1164, ASTM E 2194, and ISO 7724. The samples are placed over a white background which is referred to as "Base White". The "Base White" is the white area from the X-Rite Grey Scale Balance Card (45as45 L*a*b* 96.2-0.8 3.16).

The samples are measured with CIE Standard Illuminant D65/10° illumination. The measurement naming system used here is written where the first angle provided is the illumination angle as defined from the surface normal and the second angle is the aspecular detection angle. This is further described in FIG. 3. A region is measured on the outside panel wall is measured 3 times and the average reading is recorded.

When a color is expressed in CIELAB (L*a*b*), L* defines lightness, a* denotes the red/green value ((+a=red, −a=green), b* the yellow/blue value ((+b=yellow, −b=blue), C* defines Chroma, and h° defines Hue angle. Chroma describes the vividness or dullness of a color where + is brighter and − is duller. Chroma is also known as saturation. Lightness is difference in lightness/darkness value where + is "lighter" and − is "darker". L* represents the darkest black at L*=0, and the brightest white at L*=100. Hue is an attribute of a color by virtue of which it is discernible as red, green, etc., and which is dependent on its dominant wavelength, and independent of intensity or lightness. The $\Delta L^*$ is the difference between the max and min L* for the following six angles: Color45as-15, Color45as15, Color45as25, Color45as45, Color45as75, and Color45as110.

Haze and Reflection Methods: Haze Anisotropy, Peak Specular Reflectance (GU), and Reflection Softness (FW at ⅔ Height of Specular Profile)

The haze reported here is also called reflected haze and it is measured with a haze meter/goniophotometer such as a Rhopoint IQ (20°/60°/85° Glossmeter, DOI Meter, Haze Meter, Goniophotometer, Rhopoint Instruments Limited) according to ASTM E430.

$$\text{Reflected Haze}=100\times(\Sigma \text{ Pixels from } 17° \text{ to } 19° \text{ (sample)}+\Sigma \text{ Pixels from } 21° \text{ to } 23° \text{ (sample)})/ \text{Specular Gloss (Standard)}$$

The Haze Anisotropy is the ratio of haze (ie. reflected haze) measured for bottle samples when oriented parallel with the bottle height versus haze measured upon rotating the sample by 90°.

The Peak Specular Reflectance is measured at 20° with a diode array covering +/−7.25° from the specular angle in steps of 0.028°. Reflection Softness is measured from the Specular Profile (+/−5.6° from Specular Angle in Gloss Units) as the full width (FW) at ⅔ of the peak height for the specular profile peak.

Local Wall Thickness

Wall thickness at specific locations was measured using an Olympus Magna-Mike® 8600 using a ⅛" dia. target ball. Three measurements were taken at each location and the mean was calculated to determine the local wall thickness. The average local wall thickness was determined by determining the local wall thickness as described above across the length of the article or panel and then calculating the mean. The thickness near the shoulder and near the base is excluded from the average local wall thickness.

Total Luminous Transmittance

Total Luminous transmittance is measured using a benchtop sphere spectrophotometer such as a Ci7800 (X-Rite) using D65 illumination. The total luminous transmittance is measured in accordance with ASTM D1003. % Opacity can be calculated from 100−% total luminous transmittance. A region is measured on the outside panel wall is measured 3 times and the average reading is recorded.

Root Mean Square Roughness, Sq, Measurement Method

Root Mean Square Roughness, Sq, is measured using a 3D Laser Scanning Confocal Microscope such as a Keyence VK-X200 series microscope available from KEYENCE CORPORATION OF AMERICA) which includes a VK-X200K controller and a VK-X210 Measuring Unit. The instrument manufacturer's software, VK Viewer version 2.4.1.0, is used for data collection and the manufacturer's software, Multifile Analyzer version 1.1.14.62 and VK Analyzer version 3.4.0.1, are used for data analysis. The manufacturer's image stitching software, VK Image Stitching version 2.1.0.0, is used. The manufacturer's analysis software is compliant with ISO 25178. The light source used is a semiconductor laser with a wavelength of 408 nm and having a power of about 0.95 mW.

The sample to be analyzed is obtained by cutting a piece of the article that includes the region to be analyzed in a size that can fit the microscope for proper analysis. If the sample is not flat, but is flexible, the sample may be held down on the microscope stage with tape or other means. If, due to the shape, flexibility or other characteristic of the sample, measurements will be more accurate when the sample is not flattened, corrections may be sued, as explained hereinbelow.

The measurement data from the sample is obtained using a 50× objective lens suitable for non-contact profilometry, such as a 50× Nikon CF IC Epi Plan DI Interferometry Objective with a numerical aperture of 0.95. The data is acquired using the acquisition software's "Expert Mode", with the following parameters set as described he: 1) Height Scan Range is set to encompass the height range of the sample (this can vary from sample to sample depending on the surface topography of each); 2) Z-direction Step Size is set to 0.10 micrometers; 3) Real Peak Detection mode is set to "On"; and 4) Laser Intensity and Detector Gain are optimized for each sample using the autogain feature of the instrument control software. Arrays of 3×3 images are collected and stitched together for each sample resulting in a field of view of 790×575 μm (width×height); lateral resolution was 0.56 μm/pixel.

Prior to analysis, the data is subjected to the following corrections using the manufacturer's Multifile Analyzer software: 1) 3×3 median smoothing in which the center pixel of a 3×3 pixel array is replaced by the median value of that array; 2) noise removal using weak height cut (following built in algorithm in the analysis software), and 3) shape correction using waveform removal (0.5 mm cutoff). Specify the Reference Plane using the Set Area method and selecting the same area as was used for the form removal. Regions including foreign materials, artifacts of the sample harvesting process or any other obvious abnormalities should be excluded from analysis and alternative samples should be used for any sample which can't be accurately measured. The resulting value is the Root Mean Square Roughness, Sq, for the measured portion of the sample.

Layer Thickness & Platelet Dimensions

MicroCT Scan Method

Samples of the bottles to be tested are imaged using a microCT X-ray scanning instrument capable of scanning a sample having dimensions of at least approximately 1 mm×1 mm×4 mm as a single dataset with contiguous voxels. An isotropic spatial resolution of at least 1.8 μm is required in the datasets collected by microCT scanning One example of suitable instrumentation is the SCANCO Systems model μ50 microCT scanner (Scanco Medical AG, Bratisellen, Switzerland) operated with the following settings: energy level of 55 kVp at 72 μA, 3600 projections, 10 mm field of view, 1000 ms integration time, an averaging of 10, and a voxel size of 1.8 μm. For higher resolution, suitable instrumentation includes the X-ray tomographic microscopy capability at the TOMCAT beamline of the Swiss Light Source (SLS) at the Paul Scherrer Institute (PSI), Switzerland equipped with a high-quality microscope (Optique Peter, Lentilly, France) with a 40× objective coupled to a PCO.edge 5.5 sCMOS camera (PCO, Kelheim, Germany), 20 μm thick LuAG:Ce scintillator screen and a resulting isotropic voxel size of about 0.163 μm. The beam energy is set to 15 keV with a 250 ms exposure time and for each scan about 1501 projections are acquired.

Test samples to be analyzed are prepared by cutting a rectangular piece of the plastic from the wall, preferably label panel region with an Exacto knife and then further trimming the sample to approx. 1-5 mm in width using a fine tooth Exacto saw with care to avoid causing cracks. The sample is positioned vertically with materials such as mounting foam material within a plastic cylindrical scanning tube or by affixing the sample to a brass pin (diameter of 3.15 mm) using double-sided sticky tape and/or clear nail polish lacquer. The instrument's image acquisition settings are selected such that the image intensity contrast is sensitive enough to provide clear and reproducible discrimination of the sample structures from the air and the surrounding mounting foam. Image acquisition settings that are unable to achieve this contrast discrimination or the required spatial resolution are unsuitable for this method. Scans of the plastic sample are captured such that a similar volume of each sample with its caliper is included in the dataset.

Software for conducting reconstructions of the dataset to generate 3D renderings is supplied by the scanning instrument manufacturer. Software suitable for subsequent image processing steps and quantitative image analysis includes programs such as Avizo Fire 9.2 (Visualization Sciences Group/FEI Company, Burlington, Massachusetts, U.S.A.), and MATLAB® version 9.1 with corresponding MATLAB® Image Processing Toolbox (The Mathworks Inc. Natick, Massachusetts, U.S.A.). MicroCT data collected with a gray level intensity depth of 16-bit is converted to a gray level intensity depth of 8-bit, taking care to ensure that the resultant 8-bit dataset maintains the maximum dynamic range and minimum number of saturated voxels feasible, while excluding extreme outlier values.

Alignment of the sample surface such that it is parallel with the YZ plane of the global axis system is accomplished by one of the following ways including using a fixture for the microCT that aligns the material correctly or by using software, such as Avizo, to visually align the surface and use interpolation to resample the dataset.

The layer thickness is measured via MicroCT with image analysis where the effect pigment layer is defined as containing 95% of the pigment. The analysis is performed on a processed microCT dataset that contains a square section of material approximately 1.5 mm×1.5 mm. The dataset goes border to border in the YZ direction. It completely intersects the minimum Y border, the maximum Y border, the minimum Z border and the maximum Z border. A small non-material buffer of region will exist between the minimum X border and the maximum X border. This region will consist of air or packing material.

Layer Thickness Method

A material threshold is determined by executing Otsu's method on all the samples of interest and averaging the results. The material threshold should identify the bottle material while minimizing noise and packing material. The material threshold is applied to the aligned and trimmed dataset. Lines of voxel values, parallel to the x-axis, are acquired for every Y,Z value of the material dataset. A typical line will consist of a large continuous band of material which is the bottle. Smaller bands of material may also be present due to packing material used to hold the sample in place or due to noise. The position of the start and finish voxel of the largest band of material is recorded for each line. These positions are averaged together and give the edge of the material. The edge of the material may experience microCT diffraction artifacts caused by the sudden change in density from air to polymer. These fringe effects may bring the edge voxel values high enough to be misclassified as pigment. To eliminate this effect, the material boundary, as determined by the average start and finish position, is moved inward by 10 voxels.

With the material boundaries established, each sample is once again processed by the Ostu's method to determine a threshold for the pigments. The average of all the sample thresholds is used to segment the pigment from the material. Each dataset is thresholded with the pigment threshold to generate a pigment dataset. Pigment voxels outside the material boundary are set to zero to remove any noise and fringe effects.

The number of pigment voxels on every YZ slice is calculated within the material. The slice totals are summed to a grand total. From these summations, bounding YZ slices are defined as those which enclose 95% of the pigment material. The distances from the material boundaries to the 95% pigment boundaries is reported as the layer thicknesses.

Platelet Dimensions Method

The analysis is performed on a reconstructed voxel dataset that contains a square section of bottle material. A threshold is determined which separates the pigment platelets from the bottle material. Platelets can be enumerated in the sample using a connected components function such as the bwconncomp function available in MATLAB®. Platelets can be warped or damaged by the bottle creation process. If a platelet volume is too small for an accurate measurement, contains holes or is warped (non-planar as described below), it is ignored. Individual platelets are measured for thickness and width as described below.

First, XYZ voxel positions of the of the platelet are sent to for principle components analysis using MATLAB®'s pca function to determine the orientation of the platelet. With this information, the platelet can be reoriented such that the platelet lies nearly horizontal on the XY plane. Projecting the platelet voxels to the XY plane creates a silhouette of the platelet. This can be used to find a maximum circle in the projection which then defines a trimming template that can be used to cut the platelet into a disk shape. A Euclidian distance map (MATLAB®'s bwdist function) generated from the top of the disc is used to measure the average thickness to the bottom of the disc. This distance measurement is independent of the orientation of the platelet. If the platelet is planer (no warping), the smallest Z distance to the XY plane should be nearly constant for every XY position and the average height of the platelet measured from the smallest Z value to the largest Z value should be within 15% of the average thickness found earlier. Non-planar platelets are ignored.

The projected silhouette can be measure across its major axis width and its minor axis width using a standard imaging method for fitting ellipse available in MATLAB®'s regionprops function. This is a measure of the maximum width of the platelet and the minimum width of the platelet.

Tie Layer Thickness (Interface Layer Thickness):

A unique additive, colorant, or resin is placed within at least one of the layers which allows either Method A or Method B to map the composition over the distance normal to the interface over which the composition of the unique additive, colorant, or resin is changing between the maximum concentration and minimum concentration.

Method A: Energy Dispersive X-ray Spectroscopy (EDS) Mapping Method for adjacent layers having unique elemental composition by virtue of the resins (e.g. PET/Nylon) or colorants/additives.

Method A may be used if the bottle sample (preparation of the bottle sample is described below) will contain colorants and/or additives at or above 2 wt. % having elemental compositions which may be suitably mapped by EDS (e.g. elements higher than atomic number 3 not including carbon or oxygen). These colorants/additives can be molecular species or particulates. If they are particulate in form, they should be well dispersed such that there are about 10 or more particles within a 5 µm×5 µm×200 nm volume. Generally, the particles should be less than 500 nm in the largest dimension.

Sample Preparation:

A piece of the bottle label panel wall at least 50 mm away from shoulder/neck or base regions measuring ~3 cm×3 cm is extracted using a heated blade. The heated blade enables sectioning of the bottle without applying large amounts of force which may induce premature delamination. This accomplished by melting the panel wall material rather than cutting. The melted edges of the piece are removed with scissors, then the ~3 cm×3 cm piece is further sectioned into several pieces measuring approximately 1 cm×0.5 cm, using a new sharp single edge razor blade. The cutting force is applied along the length of the piece, parallel to the layers/interfaces, rather than perpendicular to the interface to prevent smearing across the interface.

Then, the ~1 cm×0.5 cm pieces are then hand polished, edge-on, producing a polished surface which displayed the cross-section of the bottle wall and the layered structure. The initial polishing consists of using SiC papers, with progressively smaller grit sizes (400, 600, 800, and then 1200) while using distilled water as a lubricant/coolant. The 1200 grit polished surface is then further polished, using 0.3 μm $Al_2O_3$ polishing media, with distilled water being used as lubricant. The polished samples are then ultrasonically cleaned in a solution of detergent+distilled water, for 1 min, followed by three additional rounds of ultrasonic cleaning in fresh distilled water, to rinse the detergent from the sample. A final ultrasonic cleaning is performed in ethanol for 2 min. The polished and cleaned samples are mounted on a SEM stub with double sided carbon tape with the edge-on side up, then coated with approximately 1020 nm of carbon, as deposited by carbon evaporator such as a Leica EM ACE600 (Leica Microsystems).

Identification of the Approximate Interface by SEM:

Identification of the approximate interface between A/C or C/B layers is necessary in order to allow finding the interface in the dual-beam FIB. To identify the approximate interface, SEM imaging and EDS mapping is performed by a modern field emission SEM such as a FEI (Thermo Scientific®) Apreo SEM equipped with a silicon drift EDS detector (SDD) such as an EDAX Octane Elect 30 mm² SDD (EDAX Inc.). A preliminary EDS map at about 500 to 1000× magnification is collected across the cross-sectional plane to confirm the presence of the layered structure by identifying the unique elements present in each layer. The accelerating voltage is suitably set in order to ionize the most ideal electron shell of the elements of interest in order to generate an X-ray signal. USP<1181> (USP29-NF24) provides a useful reference for choosing the best operating conditions to collect the EDS signal.

The EDS map is used to show the approximate location of the interface between the layers, after which platinum fiducial markers are deposited via e-beam deposition, using a gas injection system (GIS), to mark the location of the interface. Another, EDS map is collected, with the Pt fiducial markers, to confirm their location with respect to the interface.

Dual-Beam FIB Sample Preparation:

A thin foil sample (100-200 nm thick) is required to map the interface at suitably high resolution. The lamella is prepared using a modern dual beam FIB such as an FEI (Thermo Scientific®) Helios 600. The interface is located in the FIB with the aid of the platinum fiducial markings. A protective platinum cap is then deposited on the area of interest at the interface in the FIB, measuring approximately 30 μm×2 μm×2 μm. This is done to protect the material, which will become the lamella sample, from unnecessary damage from the ion beam. The 30 μm dimension is oriented perpendicular to the interface such that approximately 15 μm covers one side of the interface and 15 μm covers the other side. Material is then removed from each side of the platinum cap, leaving the capped region as a lamella, measuring approximately 30 μm wide×2 μm thick×10 μm deep where the interface is oriented parallel to the 10 μm direction. The lamella is then extracted, with the aid of an Omniprobe nanomanipulation device (Oxford Instruments), and attached to a copper Omniprobe grid. The lamellar sample is then thinned, using 30 kV gallium ions, until sufficiently thin (~500-200 nm). The newly-thinned lamellar sample is then cleaned with 5 kV gallium ions, to remove excess damage caused by the 30 kV thinning process.

STEM Data Collection:

Scanning transmission electron microscopy (STEM) Energy Dispersive X-ray Spectroscopy (EDS) data is collected using a modern field emission TEM such as a FEI Tecnai TF-20 (Thermo Scientific®) equipped with a modern silicon drift EDS detector (SDD) such as an EDAX Apollo XLT2 30 mm² SDD detector (EDAX Inc.) with collection and analysis software such as Apex™ (EDAX Inc.). The interface region from within the foil produced as described above is mapped with EDS to display the presence and location of the elemental constituents in the two polymer layers. The size of the EDS map is about 20×10 μm where the interface is perpendicular to the 20 μm direction ("Y" direction) and parallel to the 10 μm direction ("X" direction). The "Y" and "X" directions are perpendicular or almost perpendicular to each other.

The map is collected by using between 200 to 300 kV accelerating voltage and a beam current at or between 100 pA and 1 nA to achieve SDD count rate of at least 3,000 counts per second. The map resolution is at least 256×160 pixels with a dwell time of about 200 μs per pixel. About 200 frames are collected for a total map time of about 30 minutes. The elements of interest are selected and a standardless automatic ZAF analysis method such as the P/B-ZAF fundamental parameter analysis is selected to enable quantitative mapping.

Data Processing:

The EDS map data can be displayed as color-coded images, with a unique color corresponding to each element. The intensity of the color is scaled with the concentration of the elemental species. The EDS map data is processed to display a line profile of normalized atom % by summing the X-ray counts for each element as they occur in the "Y" direction (parallel to the interface) and the summed intensities are plotted as a function of distance across the interface in the "X" direction (normal to the interface). The distance between the maximum and minimum normalized atom % (both having about zero slope across about 2-4 microns) for at least one element is defined as the interface layer thickness.

Method B: Confocal Raman Spectroscopy Mapping Method for adjacent layers having unique spectral characteristics by virtue of the resins (e.g. PET/COC) or colorants/additives. 2D Chemical maps or line scans are collected across the layer interface using a confocal Raman microscope (Witec A300R Confocal Raman spectrometer) equipped with a continuous laser beam, motorized x-y sample scanning stage, video CCD camera, LED white-light source, diode-pumped laser excitations from 488 nm to 785 nm, and 50× to 100× (Zeiss EC Epiplan-Neofluar, NA=0.8 or better) microscope objectives.

Samples are prepared in a similar manner as described in Method A—Sample Preparation section, however the samples are uncoated.

The sample is mounted on a glass microscope slide with edge-on side up. An area of interest near the layer interface is located with the aid of the video CCD camera using the white-light source. From the area of interest, 2D Chemical maps via spectral acquisition are acquired by focusing the laser beam at or below the surface and scanning across the layer interface in the X-Y direction with steps of 1 µm or lower, with integration time lower than 1 s at each step. The integration time should be adjusted to prevent saturation of the detector. Raman images are generated using a suitable software such as the WItec™ Project Five (Version 5.0) software using spectral features unique to each polymer layer such as peak intensities, integrated areas, peak widths, and/or fluorescence. The full Raman spectral data at each pixel in the data set is corrected for cosmic rays and baseline corrected prior to image generation. To determine intermixing between polymer layers, a cross section analysis wherein the spectral features used to generate the chemical map are followed along a line drawn across the interface including at least 10 microns within area that covers the polymer layers of interest. The defined spectral features are plotted against distance in micrometers. The interlayer mixing distance (i.e. tie layer) is defined as the distance between the maximum and minimum values of the spectral features.

EXAMPLES

Figure 5C:
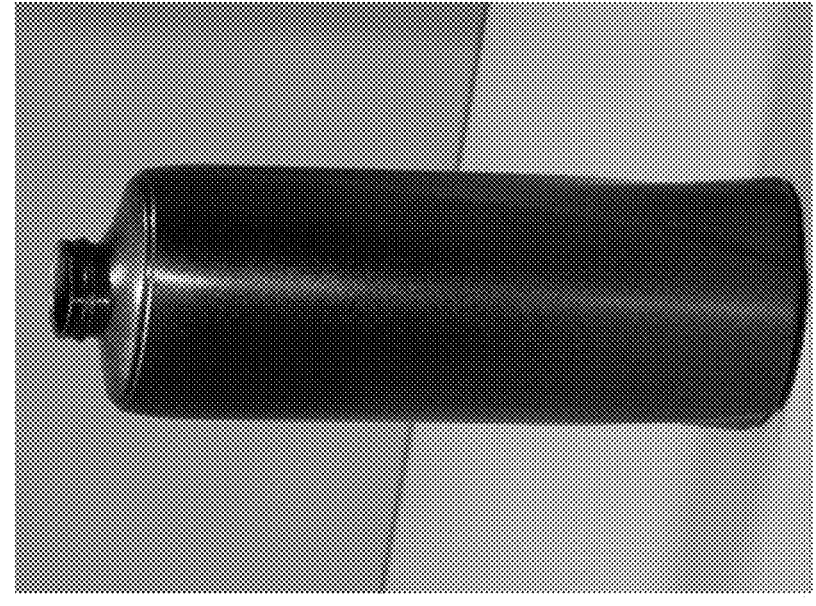
FIG. 5C is a photograph of a multilayer PET bottle with virgin PET and opaque pigment in the core and virgin PET and effect pigments in the skin layers.
Figure 5B:
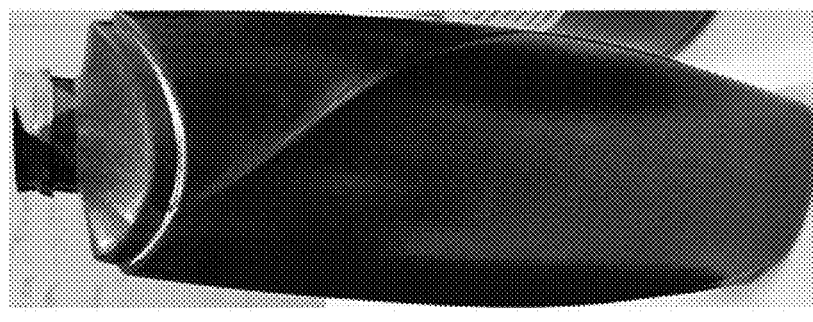
FIG. 5B is a photograph of a multilayer PET bottle with mechanically recycled PET and opaque pigment in the core layer and chemically recycled PET and effect pigments in the skin layers.
Figure 5A:
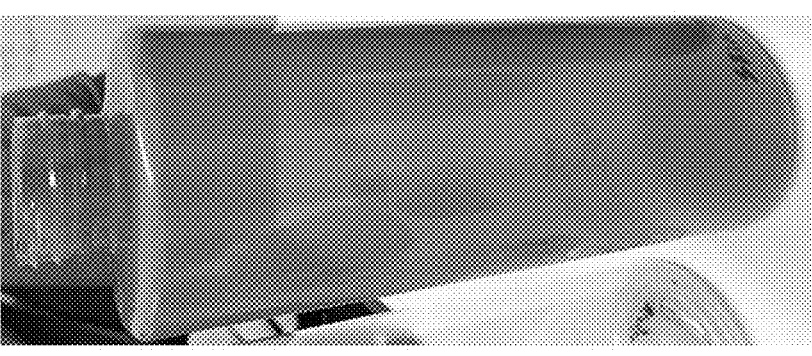
FIG. 5A is a photograph of a multilayer PET bottle with mechanically recycled PET in the core and chemically recycled PET in the skin layers.

FIG. 5A is a photograph of a trilayer bottle made via ISBM. The bottle has a core layer made from green chemically recycled PET and 4% effect pigment (Firemist® Colormotion Blue Topaz 9G680D special effect pigment, available from BASF). Even though FIG. 5B contains the same plastic as FIG. 5A, the pigment in the core and the effect pigments in the skin layer create a bottle with a super-premium aesthetic appearance.

FIG. 5C is a photograph of a trilayer bottle made via ISBM. Like the bottle in FIG. 5B, the bottle in FIG. 5C has a core with PET and carbon black pigment and skin layers that contain PET and 4% effect pigment (Firemist® Colormotion Blue Topaz 9G680D special effect pigment, available from BASF). Unlike the bottle in FIG. 5B, the bottle in FIG. 5C is made with virgin PET in the core and the skin layers, instead of a core made of mechanically recycled PET. However, both the bottle in FIG. 5B and FIG. 5C have a has a rich goniochromatic optical response.

The angle dependence color was measured to compare the trilayer bottle with the recycled PET core of FIG. 2B with the trilayer bottle with the virgin core of FIG. 2C. Table 1 shows the a* and b* change as a function of viewing angle for the bottle of FIG. 5B and the bottle of FIG. 5C. As shown in Table 1, both a* and b* change as a function of viewing angle. a* and b* are approximately the same across all viewing angels for the bottle with the recycled PET core (FIG. 5B) and the bottle with the virgin PET core (FIG. 5C). The differences would not be visually perceptible to a viewer.

TABLE 1

| | Trilayer bottle with recycled PET core (FIG. 5B) a* | Trilayer bottle with virgin PET core (FIG. 5C) a* | Trilayer bottle with recycled PET core (FIG. 5B) b* | Trilayer bottle with virgin PET core (FIG. 5C) b* |
|---|---|---|---|---|
| Color45as-15 | 52.20 | 53.78 | −48.71 | −49.39 |
| Color45as15 | 10.01 | 11.82 | −44.73 | −45.84 |
| Color45as25 | 0.4 | 0.99 | −33.73 | −34.49 |
| Color45as45 | −5.21 | −5.46 | −16.80 | −17.09 |
| Color45as75 | −2.80 | −2.90 | −9.82 | −9.96 |
| Color45as110 | −0.12 | −0.08 | −6.70 | −6.93 | mechanically recycled PCR pellets (available from Evergreen® Plastics, Ohio, USA) and the skin layers are made from virgin PET (DAK Americas®, Indiana, USA) and chemically recycled PET (C181, available from Indorama Ventures®, Bangkok, Thailand), which has essentially the same properties as virgin PET. The bottle was made via ISBM. Just like bottle 112, in FIG. 1, this bottle is swamp water green and unattractive to consumers.

FIG. 5B is a photograph of a trilayer bottle made via ISBM. Like the bottle in FIG. 5A, the bottle in FIG. 5B has a core made from green mechanically recycled PCR pellets available from Evergreen® Plastics, Ohio, USA). In addition to the recycled PCR (C181, available from Indorama Ventures®, Bangkok, Thailand) the core also contains 5% opaque black pigment. The skin layers contain virgin PET, Table 2 shows the C* and L* change as a function of viewing angle for trilayer bottle with a mechanically recycled PET core of FIG. 5B and the trilayer bottle with a virgin PET core of FIG. 5C. Table 2, shows that C* and L* both change as a function of viewing angle. The C* across each of the six viewing angels is approximately the same, indicating that the bottle with the recycled PET core and the bottle with the virgin PET would appear to have the same intense chromatic effect when viewed by a person with normal visual acuity. L* is the greatest at the angle Color45as-15 for both bottles. The maximum ΔL* across the six viewing angles for the bottle with the recycled core (FIG. 5B) is 70.6 and for the bottle with the virgin core (FIG. 5C) ΔL* is 71.6. This indicates that the lightness varies significantly across the viewing angles both bottles and the differences would not be visually perceptible to a viewer.

TABLE 2

| | Trilayer bottle with recycled PET core (FIG. 5B) C* | Trilayer bottle with virgin PET core (FIG. 5C) C* | Trilayer bottle with recycled PET core (FIG. 5B) L* | Trilayer bottle with virgin PET core (FIG. 5C) L* | C* Ratio, Virgin Core (FIG. 5C)/ Recycle Core (FIG. 5B) | ΔC* Virgin Core (FIG. 5C) vs. Recycle Core (FIG. 5B) |
|---|---|---|---|---|---|---|
| Color45as−15 | 72.8 | 73.0 | 77.5 | 77.7 | 1.00 | 0.2 |
| Color45as15 | 46.8 | 47.3 | 68.3 | 68.4 | 1.01 | 0.5 |
| Color45as25 | 33.9 | 34.5 | 40.2 | 40.5 | 1.02 | 0.6 |
| Color45as45 | 17.2 | 17.9 | 19.6 | 19.8 | 1.04 | 0.7 |
| Color45as75 | 10.3 | 10.4 | 9.7 | 10.0 | 1.01 | 0.1 |
| Color45as110 | 6.7 | 6.9 | 6.9 | 6.1 | 1.03 | 0.2 |

Table 3 shows the color flop magnitude (ΔE*) for Color45as-15 versus Color45as45 of the trilayer bottle with the recycled PET core (FIG. 5B) and the trilayer bottle with the virgin PET core. Table 3 confirms that there is a significant color flop for both bottles and the difference would not be visually perceptible to a viewer.

TABLE 3

| | Trilayer bottle with recycled PET core (FIG. 5B) | Trilayer bottle with virgin PET core (FIG. 5C) |
|---|---|---|
| ΔE* | 84 | 85 |

Examples 1-10, described in the tables below are blow molded bottles formed from thermoplastic resins that contain mechanically recycled PET (mPET), chemically recycled PET (arPET), virgin PET, and combinations thereof and additives, such as one or more pigments and/or dyes. arPET is virgin-like PET, as it has visual and structural properties that are similar to virgin PET. mPET can have fairly robust mechanical properties, however, the visual properties are generally unlike virgin PET, as mPET generally has an off color and visual impacts. The inventors found, as illustrated in the examples below, that bottles with unique or premium visual effects could be formed from a thermoplastic resin that contained a significant portion of mPET if the bottle was a multilayer bottle that also had pigments or dyes in the core and/or skin layers.

The examples below show high levels of optical properties with low grade material. The blow molded bottles were also tested for visual appearance through L*a*b*, haze, and Gloss 20°. The methods for measuring haze and gloss 20° are described herein.

For Table 4 to Table 13, below, the ΔE values are mathematically expressed by the equation:

$$\Delta E^* = [(L^*x - L^*_Y)^2 + (a^*x - a^*_Y)^2 + (b^*x - b^*_Y)^2]^{1/2}$$

the ΔE of each example is compared to the first example in each table (e.g. Ex. 1 vs. 2, and 1 vs. 3, and so forth).

CIE LAB scale is the color scale used Measurements are made with a spectrophotometer such as a Hunter Color reflectance meter or X-Rite Ci64 spherical spectrophotometer A complete technical description of the system can be found in an article by R. S. Hunter, 'photoelectric color difference Meter', Journal of the Optical Society of America, Vol. 48, pp. 985-95, 1958. Devices specially designed for the measurement of color on the Hunter scales are described in U.S. Pat. No. 3,003,388 to Hunter et al., issued Oct. 10, 1961. In general, Hunter Color "L" scale values are units of light reflectance measurement, and the higher the value is, the lighter the color is since a lighter colored material reflects more light. In particular, in the Hunter Color system the "L" scale contains 100 equal units of division. Absolute black is at the bottom of the scale (L=0) and absolute white is at the top of the scale (L=100). Thus, in measuring Hunter Color values of the articles according to the present invention, the lower the "L" scale value, the darker the material. The articles herein might be of any color provided that the L Hunter value defined herein is met. When a color is defined according to this system L* represents lightness (0=black, 100=white), a* and b* independently each represent a two-color axis, a* representing the axis red/green (+a=red, −a=green), while b* represents the axis yellow/blue (+b=yellow, −b=blue). A white background was used to maintain similar color behind the sample (the white portion of X-Rite Grey Scale Balance Card (45as45 L*a*b* 96.2-0.8 3.16) or a Byko-Chart Opacity 2A or similar Opacity Chart as manufactured by BYK, a member of Altana).

TABLE 4

Figure 6A:
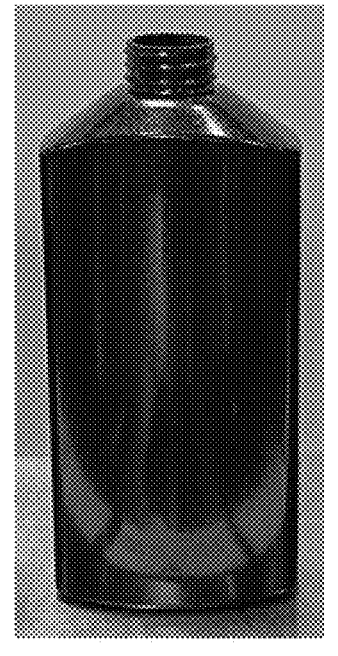
FIG. 6A is a photograph of Example 1, a multilayer PET bottle with 66.8% PCR.

| | | | | | Description of Examples 1-3 | | |
|---|---|---|---|---|---|---|---|
| | | | | | Description | | |
| Ex. | FIG. | Tech. | | Skin Material | Core Material | | PCR Content |
| 1 | FIG. 6A | Co-Injection ISBM | | arPET (50% blend, EN001 Renew available from Eastman Chemical) at 96.0% LDR and glitter red pigment (available from Clariant ®) at 4.0% LDR | mPET (green/mixed bale, available from Evergreen Plastics ®) at 95.0% LDR and opaque black pigment (available from Clariant ®) at 5.0% LDR | | 66.8% |

TABLE 4-continued

| | | | | | PCR |
|---|---|---|---|---|---|
| | | Description | | | |
| Ex. FIG. | Tech. | Skin Material | Core Material | | Content |
| 2 | Co-Injection ISBM | mPET PCR (available from Indorama Ventures ®) at 96.0% LDR and glitter red pigment (available from Clariant ®) at 4.0% LDR | mPET (green/mixed bale, available from Evergreen Plastics ®) at 95.0% LDR and opaque black pigment (available from Clariant ®) at 5.0% LDR | | 95.6% |
| 3 FIG. 6C | Mono-layer ISBM | Resin #1: arPET (50% blend, EN001 Renew available from Eastman Chemical) at 57.6% LDR Resin #2: mPET (green/mixed bale, available from Evergreen Plastics ®) at 38% LDR Colorant #1: Glitter red pigment (available from Clariant ®) at 2.4% LDR Colorant #2: Opaque black pigment (available from Clariant ®) at 2.0% LDR | | | 66.8% |

TABLE 5

Color Difference, Haze, and Gloss 20° for Examples 1-3

| Ex. | L* | a* | b* | C* | ΔE | Haze | Gloss 20° |
|---|---|---|---|---|---|---|---|
| 1 | 34.12 | 18.25 | 3.5 | 18.58 | | 17.49 | 34.87 |
| 2 | 34.16 | 17.77 | 2.76 | 17.98 | 0.88 | 12.65 | 21.7 |
| 3 | 28.33 | 1.55 | −0.88 | 1.78 | 18.21 | 15.71 | 59.23 |

Examples 1 and 2 both show that multilayer blow molded bottles where the majority of the thermoplastic resin is made from PCR plastic can have high quality optical properties, especially when pigments are incorporated into the skin and/or core layers.

In Example 2, all the thermoplastic resin in the bottle is mPET PCR. The mPET PCR from Indorama Ventures® is a food grade mPET that was used in the skin layers. It has an off color and is noticeably different than virgin PET or arPET. However, the color of Indorama Ventures® mPET is generally more consistent than the green/mixed bale mPET from Evergreen Plastics® that was used in the core. By using a multilayer structure and putting pigment in the skin layers and core, the inventors were able to overcome the yellow discoloration and cloudiness that generally occurs when mPET is processed into preforms and then bottles due to oxidation. Table 5 shows that the optical properties between Examples 1 and 2 are similar and it is unlikely that the small difference would be consumer noticeable at a store shelf.

Figure 6C:
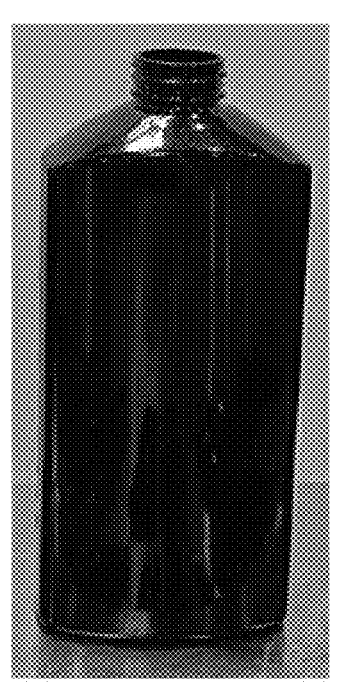
FIG. 6C is a photograph of Example 3, a monolayer bottle with 66.8% PCR.
Figure 6E:
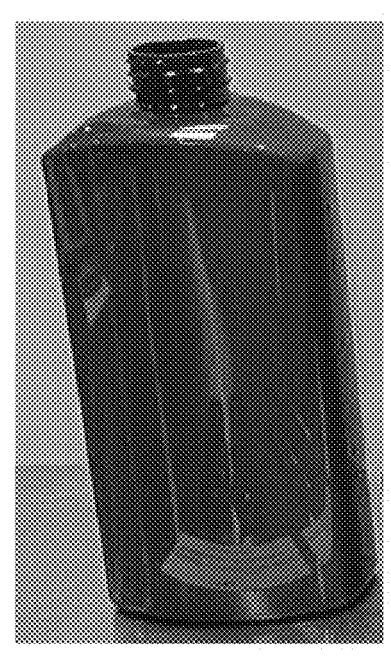
FIG. 6E is a photograph of Example 5, a multilayer PET bottle with 67% PCR.
Figure 6B:
FIG. 6B is a photograph of a cross-section of a preform that could be blow molded into the Example 1 bottle.
Figure 6D:
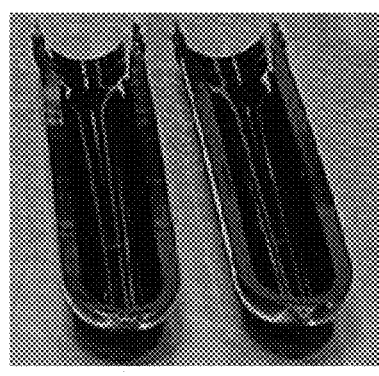
FIG. 6D is a photograph of a cross-section of a preform that could be blow molded into the Example 3 bottle.

The bottles in Examples 1 and 3 have the same overall concentrations of resin and additives. However, the multi-layer bottle in Example 1 (see FIG. 6A) appears as a dark red color, while the monolayer bottle in Example 3 (see FIG. 6C) appears as a very dark, almost black color due in large part to the black pigment suspended across the monolayer. Examples 1 and 2 have high chroma (C*) versus very low chroma for Example 3. A preform that can be blow molded into the bottle in FIG. 6A is cut crosswise and shown in FIG. 6B. In FIG. 6B, the wall of the preform has three distinct layers: two red skin layers and a black core. A preform that can be blow molded into the bottle in FIG. 6C is cut crosswise and shown in FIG. 6D. In FIG. 6D, the wall of the preform has one layer and it appears black. It may be difficult to manufacture thermoplastic bottles from green/mixed bales of PCR thermoplastic material that are different colors in a mono-layer bottle and therefore, a multilayer bottle, as in Example 1, may be preferred.

Examples 1 and 2 had slightly less gloss 20°, as compared to Example 3. This is because the red glitter pigment was more concentrated in the skin layers of Examples 1 and 2, as compared to Example 3. The red glitter pigment is a relatively large particle size and it can introduce surface roughness due to large particles being located near or at the surface. The introduction of surface roughness will decrease gloss while increasing the reflected haze. Therefore, the gloss 20° values for Examples 1 and 2 are lower as compared to the gloss 20° values for the other examples (e.g. Ex. 4-5, 7, and 9-12). As shown in FIG. 6A, the bottle has an attractive, premium visual appearance. However, if the highest possible gloss is desired, it may not be desirable to include pigments with a large particle size in the skin layers.

TABLE 6

Description of Examples 4-6

| | | | | | PCR |
|---|---|---|---|---|---|
| | | Description | | | |
| Ex. FIG. | Tech. | Skin Material | Core Material | | Content |
| 4 | Co-Injection ISBM | mPET PCR (available from Indorama Ventures ®) at 94% LDR and red 1 colorant (from Penn Color ®) at 6.0% LDR | mPET (green/mixed bale, available from Evergreen Plastics ®) at 97.0% LDR and pearl white (available from Penn Color ®) at 3.0% LDR | | 95.2% |

TABLE 6-continued

Description of Examples 4-6

Description

| Ex. FIG. | Tech. | Skin Material | Core Material | PCR Content |
|---|---|---|---|---|
| 5 FIG. 6E | Co-Injection ISBM | arPET PCR (50% blend, EN001 Renew available from Eastman Chemical) at 94.0% LDR and red 1 colorant (from Penn Color ®) at 6.0% LDR | mPET (green/mixed bale, available from Evergreen Plastics ®) at 97.0% LDR and pearl white (available from Penn Color ®) at 3.0% LDR | 67.0% |
| 6 FIG. 6G | Mono-layer ISBM | Resin #1: arPET (50% blend, EN001 Renew available from Eastman Chemical) at 56.4% LDR<br>Resin #2: mPET (green/mixed bale, available from Evergreen Plastics ®) at 38.8% LDR<br>Colorant #1: red 1 colorant (from Penn Color ®) at 3.6% LDR<br>Colorant #2: Pearl white (available from Penn Color ®) at 1.2% LDR | | 67.0% |

TABLE 7

Color Difference, Haze, and Gloss 20° for Examples 4-6

| Example | L* | a* | b* | ΔE | Haze | Gloss 20° |
|---|---|---|---|---|---|---|
| 4 | 42.79 | 37.02 | 16.8 | | 6.47 | 74.42 |
| 5 | 42.81 | 41.69 | 19.12 | 5.21 | 2.49 | 83.62 |
| 6 | 50.3 | 34.19 | 19.26 | 8.39 | 11.26 | 15.14 |

Like Example 2, all the thermoplastic resin in the Example 4 multilayer bottle is mPET PCR. By using a multilayer structure and putting pigment in the skin layers and core, the inventors were able to achieve similar optical properties in Example 4, as compared to Example 5 (see Table 7). The color attributes (L*, a*, b*) between Examples 4 and 5 is similar, therefore the ΔE is low. The gloss and haze for both Examples 4 and 5 is consumer acceptable, however, the gloss is slightly higher, and the haze is slightly lower for Example 5, which could be consumer preferable from purely an aesthetic point of view. However, at a store shelf, a consumer would find both bottles to have a striking, premium appearance.

Figure 6F:
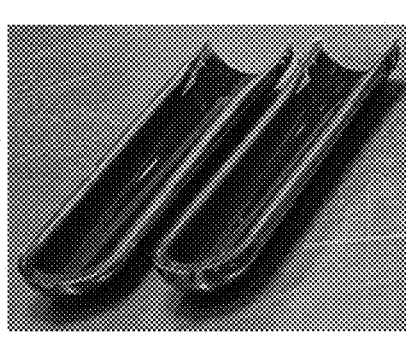
FIG. 6F is a photograph of a cross-section of a preform that could be blow molded into the Example 5 bottle.
Figure 6G:
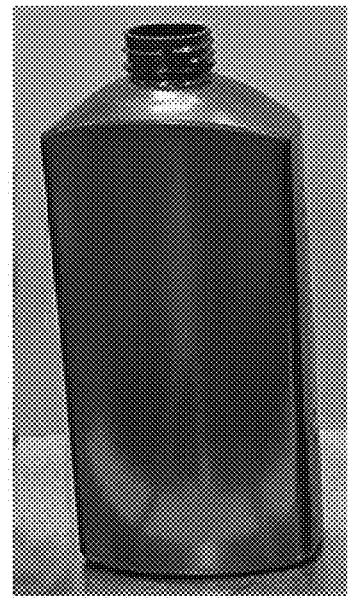
FIG. 6G is a photograph of Example 6, a monolayer PET bottle with 67% PCR.
Figure 6I:
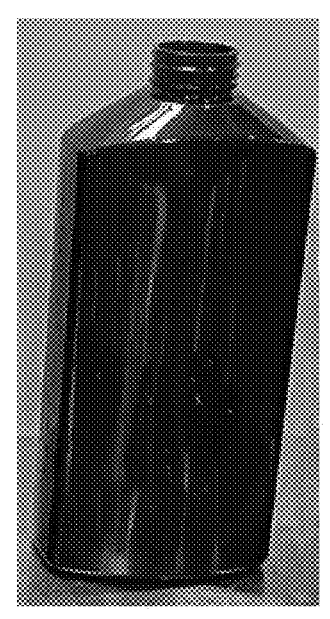
FIG. 6I is a photograph of Example 9, a multilayer PET bottle with 65% PCR.
Figure 6K:
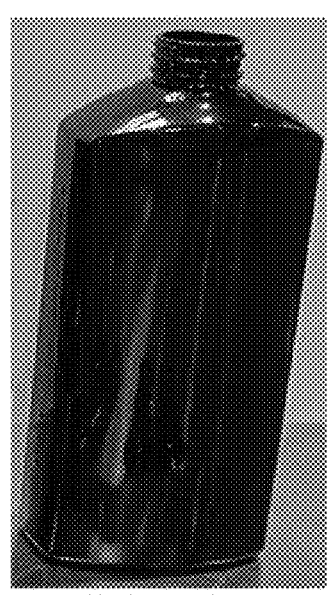
FIG. 6K is a photograph of Example 10, a multilayer PET bottle with 65% PCR.
Figure 6H:
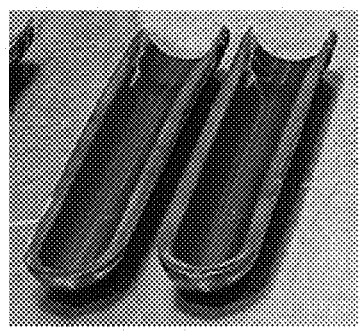
FIG. 6H is a photograph of a cross-section of a preform that could be blow molded into the Example 6 bottle.

The bottles in Examples 5 and 6 have the same overall concentrations of resin and additives. However, the multilayer bottle in Example 5 (see FIG. 6E) appears as a glossy bottle with a deep red color, while the multilayer bottle in Example 3 (see FIG. 6G) appears as a substantially less glossy bottle with a duller red color, as compared to Example 5. The ΔE is greater for Example 6 than for Example 5. A preform that can be blow molded into the bottle in FIG. 6E is cut crosswise and shown in FIG. 6F. In FIG. 6F, the wall of the preform has three distinct layers: two red skin layers and a green core. A preform that can be blow molded into the bottle in FIG. 6G is cut crosswise and shown in FIG. 6H. In FIG. 6H, the wall of the preform has one layer and it appears as a red color with some cloudy portions. The cloudiness in the preform in FIG. 6H is from the pearl white pigment and the green/mixed bale PCR in the monolayer. It may be difficult to manufacture thermoplastic bottles from green/mixed bales of PCR thermoplastic material that have deep, glossy, premium appearances with a mono-layer bottle and therefore, a multilayer bottle, as in Example 5, may be preferred.

TABLE 8

Description of Examples 7-8

Description

| Ex. | Tech. | Skin Material | Core Material | PCR Content |
|---|---|---|---|---|
| 7 | Co-Injection ISBM | arPET PCR (50% blend, EN001 Renew available from Eastman Chemical) at 94.0% LDR and red 2 colorant (from Penn Color ®) at 6.0% LDR | arPET PCR (50% blend, EN001 Renew available from Eastman Chemical) at 96.5% LDR and opaque white colorant (from Clariant ®) at 3.5% LDR | 47.5% |
| 8 | Mono-layer ISBM | In market mono-layer Old Spice ® opaque red PET bottle. | | 0% |

TABLE 9

Color Difference, Haze, and Gloss 20° for Examples 7-8

| Example | L* | a* | b* | C* | ΔE | Haze | Gloss 20° |
|---|---|---|---|---|---|---|---|
| 7 | 44.35 | 47.54 | 22.15 | 52.44 | | 2.42 | 86.53 |
| 8 | 44.39 | 56.10 | 29.56 | 63.40 | 11.3218 | 0.72 | 94.05 |

Example 7 is a multilayer bottle with 47.5% PCR content. In Example 7 both the skin layers and the core had arPET PCR. Example 8 is a current, in market mono-layer PET bottle that is opaque and red. Both Examples 7 and 8 have good optical properties. It was found that Example 7, even with 47.5% PCR, had excellent optical properties including high gloss and a vibrant color as shown by the high chroma (C*).

thermoplastic material that are different colors in a mono-layer bottle and therefore, a multilayer bottle, as in Example 9, may be preferred.

TABLE 10

Description of Examples 9-10

| | | | Description | | |
|---|---|---|---|---|---|
| Ex. FIG. | Tech. | Skin Material | Core Material | | PCR Content |
| 9 FIG. 6I | Co-Injection ISBM | arPET PCR (50% blend, EN001 Renew available from Eastman Chemical) at 90.0% LDR and red 3 colorant (from Penn Color ®) at 10.0% LDR | mPET (green/mixed bale, available from Evergreen Plastics ®) at 95.0% LDR and opaque black (available from Clariant ®) at 5.0% LDR | | 65.0% |
| 10 FIG. 6K | Mono-layer ISBM | Resin #1: arPET (50% blend, EN001 Renew available from Eastman Chemical) at 54.0% LDR Resin #2: mPET (green/mixed bale, available from Evergreen Plastics ®) at 38.0% LDR Colorant #1: red 3 colorant (from Penn Color ®) at 6.0% LDR Colorant #2: Opaque black (available from Clariant ®) at 2.0% LDR | | | 65.0% |

TABLE 11

Color Difference, Haze, and Gloss 20° for Examples 9-10

| Example | L* | a* | b* | C* | ΔE | Haze | Gloss 20° |
|---|---|---|---|---|---|---|---|
| Ex. 9 | 35.53 | 29.29 | 9.31 | 30.73 | | 4.3 | 77.91 |
| Ex. 10 | 29.91 | 4.99 | −0.19 | 4.99 | 26.6894 | 5.96 | 81.08 |

TABLE 12

Description of Examples 11-12

| | | Description | | |
|---|---|---|---|---|
| Ex. | Tech. | Skin Material | Core Material | PCR Content |
| 11 | Co-Injection ISBM | mPET PCR (available from Indorama Ventures ®) at 100.0% LDR | mPET (green/mixed bale, available from Evergreen Plastics ®) at 95.0% LDR and opaque black (available from Clariant ®) at 5.0% LDR | 98.0% |
| 12 | Co-Injection ISBM | arPET Blend (80/20 blend, available from APG) at 100.0% LDR | mPET (green/mixed bale, available from Evergreen Plastics ®) at 95.0% LDR and opaque black (available from Clariant ®) at 5.0% LDR | 50.0% |

Figure 6J:
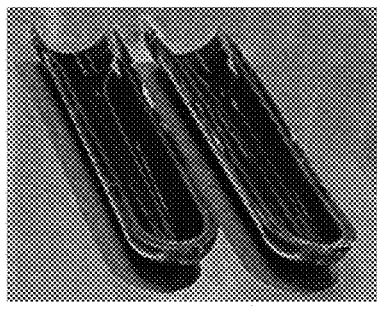
FIG. 6J is a photograph of a cross-section of a preform that could be blow molded into the Example 9 bottle.
Figure 6L:
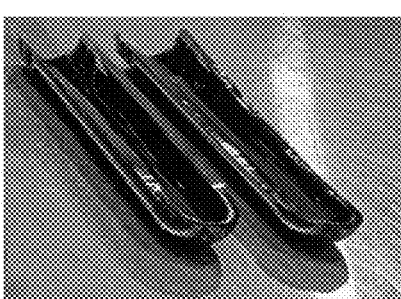
FIG. 6L is a photograph of a cross-section of a preform that could be blow molded into the Example 10 bottle.

The bottles in Examples 9 and 10 have the same overall concentrations of resin and additives. However, the multi-layer bottle in Example 9 (see FIG. 6I) appears as a glossy bottle with a deep dark cherry red color, while the multilayer bottle in Example 10 (see FIG. 6K) appears as a less glossy bottle with a duller, darker red color that appears dark brown or almost black, as compared to Example 5. The chroma (C*) is much higher for Example 9 compared to Example 10. A preform that can be blow molded into the bottle in FIG. 6I is cut crosswise and shown in FIG. 6J. In FIG. 6J, the wall of the preform has three distinct layers: two red skin layers and a dark colored core. A preform that can be blow molded into the bottle in FIG. 6K is cut crosswise and shown in FIG. 6L. In FIG. 6L, the wall of the preform has one layer and it appears dark brown or black. It may be difficult to manu-facture thermoplastic bottles from green/mixed bales of PCR

TABLE 13

Color Difference, Haze, and Gloss 20° for Examples 11-12

| Example | L* | a* | b* | ΔE | Haze | Gloss 20° |
|---|---|---|---|---|---|---|
| 11 | 29.36 | 0.03 | −0.93 | | 4.83 | 90.08 |
| 12 | 29.59 | 0.14 | −0.66 | 0.3713 | 4.07 | 97.24 |

Examples 11 and 12 are multilayer blow molded bottles with a significant amount of PCR plastic that have excellent visual properties, even with Example 11 including 100% PCR. Examples 11 and 12 show that by using a multilayer structure and putting pigment in the skin layers and core, the inventors were able to overcome the yellow discoloration and cloudiness that generally occurs when mPET is processed into preforms and then bottles due to oxidation. Table 13 shows that the optical properties between Examples 11 and 12 are similar and it is unlikely that the small difference would be consumer noticeable at a store shelf.

Combinations

A. A blow molded multilayer article comprising:
   a. a hollow body defined by a wall comprising an inner surface and an outer surface, the wall being formed in at least one region by 3 or more layers comprising:
      i. a first skin layer and a second skin layer comprising:
         a first thermoplastic material; and
         effect pigment and/or porogen;
         wherein the first skin layer comprises the outer surface of the wall in the region and the second skin layer comprises the inner surface of the wall in the region;
      ii. a core sandwiched between the first skin layer and the second skin layer, wherein the core comprises:
         from about 90% to about 99% recycled thermoplastic material comprising a second thermoplastic material and greater than 200 ppm impurities;
         pigment and/or dye;
         wherein the article comprises greater than 30% recycled thermoplastic material.

B. A blow molded multilayer article comprising:
   a. a hollow body defined by a wall comprising an inner surface and an outer surface, the wall being formed in at least one region by 3 or more layers comprising:
      i. a first skin layer and a second skin layer comprising:
         a thermoplastic material; and
         effect pigment and/or porogen;
         wherein the first skin layer comprises the outer surface of the wall in the region and the second skin layer comprises the inner surface of the wall in the region;
      ii. an opaque core sandwiched between the first skin layer and the second skin layer, wherein the core comprises:
         from about 90% to about 99% recycled thermoplastic material comprising a second thermoplastic material and an L* value of L* value of less than or equal to 80;
         a pigment and/or dye;
         wherein the first skin layer and the core are slightly interpenetrated at an interface between the first skin layer and the core.

C. An array of articles, wherein each article comprises
   a. a hollow body defined by a wall comprising an inner surface and an outer surface, the wall being formed in at least one region by 3 or more layers comprising:
      i. a first skin layer and a second skin layer comprising:
         a thermoplastic material; and
         an effect pigment and/or porogen;
         wherein the first skin layer comprises the outer surface of the wall in the region and the second skin layer comprises the inner surface of the wall in the region;
      ii. a core sandwiched between the first skin layer and the second skin layer, wherein the core comprises:
         mechanically recycled thermoplastic material comprising a second thermoplastic material;
         a pigment and/or dye;

wherein each article comprises a ΔE*−15° vs 45° using illumination at 45°, ΔL*, and mean C* and the ΔE*−15° vs 45°, ΔL* that varies by less than 6 units, across the array, as measured according to Goniospectrophotometry Method described herein.

D. The blow molded multilayer article according to Paragraphs A-C, wherein the recycled thermoplastic material comprises mechanically recycled thermoplastic material.

E. The blow molded multilayer article according to Paragraphs A-D, wherein the first thermoplastic material and/or the second thermoplastic material comprises polyethylene terephthalate.

F. The blow molded multilayer article according to Paragraphs A-E, wherein the skin layer comprises effect pigment comprising particles and the particles are oriented so a face is parallel to the outer surface.

G. The blow molded multilayer article according to Paragraphs A-F, wherein the core and/or the article is opaque.

H. The blow molded multilayer article according to Paragraphs A-G, wherein the core comprises from about 0.1% to about 6%, preferably from about 0.3% to about 4%, preferably from about 0.5% to about 2%, by weight of the core, pigment and/or dye.

I. The blow molded multilayer article according to Paragraphs A-H, wherein the recycled thermoplastic material comprises from about 0.01% to about 2%, preferably from about 0.05% to about 1%, preferably from about 0.1% to about 0.75%, by weight of the thermoplastic material, of impurities.

J. The blow molded multilayer article according to Paragraphs A-I, wherein the recycled thermoplastic material comprises greater than 200 ppm, preferably greater than 500 ppm, and more preferably greater than 1000 ppm of impurity.

K. The blow molded multilayer article according to Paragraphs A-J, wherein the recycled thermoplastic material contains less than 99.99%, less than 99.9%, less than 99%, less than 98.75%, and/or less than 98.5%, thermoplastic material.

L. The blow molded multilayer article according to Paragraphs A-K, wherein the skin layer comprises from about 0.1% to about 6%, preferably from about 0.3% to about 4%, and more preferably about 0.5% to about 2%, by weight of the skin layers, effect pigment and/or porogen.

M. The blow molded multilayer article according to Paragraphs A-L, wherein the skin layer comprises contain from about 94% to about 99.9%, preferably from about 96% to about 99.7%, more preferably from about from about 98% to about 99.5%, by weight of the skin layers, thermoplastic material selected from the group including virgin thermoplastic material, recycled thermoplastic material, and combinations thereof.

N. The blow molded multilayer article according to Paragraphs A-M, wherein the article comprises greater than 30%, greater than 35%, greater than 40%, greater than 45%, greater than 50%, greater than 60%, greater than 65%, greater than 70%, greater than 75%, greater than 80%, greater than 85%, greater than 90%, greater than 95%, %, greater than 90%, greater than 95%, by weight of the article, recycled thermoplastic material.

O. The blow molded multilayer article according to Paragraphs A-N, wherein at least 30%, preferably at least 50%, more preferably at least 70%, most preferably at least 90%, and of an area of the outer surface of the article comprises a 20° gloss of greater than or equal to 65 GUs, preferably greater than or equal to 68 GUs, preferably greater than or equal to 70 GUs, preferably greater than or equal to 71 GUs, preferably greater than or equal to 73 GUs, preferably greater than or equal to 75 GUs, preferably greater than or equal to 80 GUs, preferably greater than or equal to 85 GUs, preferably greater than or equal to 90 GUs, and preferably greater than or equal to 95 GUs, as measured according to the Gloss 20° Method described herein.

P. The blow molded multilayer article according to Paragraphs A-O, wherein a location on the outer surface of the article comprises a haze of ≤30, preferably ≤20, preferably ≤15, preferably ≤10, preferably ≤5, preferably ≤3, and preferably ≤2, as measured according to the Haze and Reflection Method described herein.

Q. The blow molded multilayer article according to Paragraphs A-P, wherein a location on the outer surface of the article comprises a haze anisotropy of <1, preferably ≤0.9, preferably ≤0.8, preferably ≤0.7, and more preferably ≤0.6, as measured according to the Haze and Reflection Method described herein.

R. The blow molded multilayer article according to Paragraphs A-Q, wherein there is an interface layer between the first skin layer and the core comprising a thickness from about 500 nm to about 125 μm, preferably from about 1 μm to about 100 μm, preferably from about 3 μm to about 75 μm, preferably from about 6 μm to about 60 μm, preferably from about 10 μm to about 50 μm, as measured according to the Tie Layer Thickness Method described herein.

S. The blow molded multilayer article according to Paragraphs A-R, wherein the article had a Critical Normal Load greater than 30 N, preferably greater than or equal to 50N, more preferably greater than or equal to 60 N, and most preferably greater than or equal to 90 N, as measured by the Critical Normal Load Test Method described herein.

T. The blow molded multilayer article according to Paragraphs A-S, wherein the core layer comprises a L* of less than or equal to 80, preferably less than or equal to 70, preferably less than or equal to 60, preferably less than or equal to 50, preferably less than or equal to 40, preferably less than or equal to 30, preferably less than or equal to 20, preferably less than or equal to 10, alternatively less than or equal to 5, as measured according to Goniospectrophyotometry Method described herein.

U. The blow molded multilayer article according to Paragraphs A-T, L* of from about 0 to about 80, preferably from about 0 to about 75, preferably from about 0 to about 65, preferably from about 0 to about 55, preferably from about 0 to about 50, preferably from about 0 to about 45, and/or of from about 0 to about 40, as measured according to Goniospectrophyotometry Method described herein.

V. The blow molded multilayer article according to Paragraphs A-U, wherein the ΔE*−15° vs 45° using illumination at 45°, ΔL*, and mean C* for the multilayer article are within about 6 units, preferably within about 5 units, preferably within about 4 units, preferably within about 3 units, preferably within about 2 units, and preferably within about 1 unit as a multilayer structure comprising the same materials except the core comprises virgin thermoplastic material, as measured according to Goniospectrophyotometry Method described herein.

W. The blow molded multilayer article according to Paragraphs A-U, wherein the article comprises a ΔE*−15° vs 45° using illumination at 45° of greater than 20, preferably greater than 30, preferably greater than 40, preferably greater than 50, preferably greater than 60, preferably greater than 75, preferably greater than 80, preferably greater than 85, preferably greater than 90, preferably greater than 95, preferably greater than 100, and preferably greater than 105, according to Goniospectrophotometry Method described herein.

X. The blow molded multilayer article according to Paragraphs A-U, wherein the article comprises comprises a ΔE*−15° vs 45° using illumination at 45° from about 25 to about 150, from about 35 to about 145, from about 45 to about 140, from about 50 to about 135, from about 55 to about 130, about 60 to about 130, from about 75 to about 130, from about 90 to about 125, from about 95 to about 130, from about 100 to about 125, and/or from about 105 to about 120, according to Goniospectrophotometry Method described herein.

Y. The article according to Paragraphs A-X, wherein the article is a bottle.

Z. The article according to Paragraphs A-Y, wherein the first thermoplastic material and/or the second thermoplastic is selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), polypropylene (PP), and a combination thereof.

AA. The article according to Paragraphs A-Z, wherein the first thermoplastic material and/or the second thermoplastic is selected from the group consisting of PET, PP, HDPE, LDPE, and combinations thereof.

BB. The article according to Paragraphs A-AA, wherein the core comprises a pigment comprising an opacifying pigment comprising particles wherein the particle size of the pigment is larger than 15 nm, preferably larger than 100 nm, preferably larger than 500 nm, and preferably larger than 1 micrometer.

CC. The article according to Paragraphs A-BB, wherein the outer surface of the article comprises a location comprising a Root Mean Square Roughness, Sq., of less than 50 μin (1.27 μm), less than 45 μin (1.12 μm), less than 40 μin (1.016 μm), less than 35 μin (0.89 μm), and/or less than 32 μin (0.8128 μm), as measured according to Root Mean Square Roughness, Sq, Measurement Method described herein.

DD. The article according to Paragraphs A-CC, wherein the outer surface comprising an ΔE*−15° vs 45° for a multilayer structure using illumination at 45°, preferably greater than 20, preferably greater than 30 greater than 40, preferably greater than 50, preferably greater than 60, preferably greater than 75, preferably greater than 80, preferably greater than 85, preferably greater than 90, preferably greater than 95, preferably greater than 100, and preferably greater than 105, according to Goniospectrophyotometry Method described herein.

EE. The article according to Paragraphs A-DD, wherein the outer surface comprising an ΔE*–15° vs 45° for a multilayer structure using illumination at 45°, from about 25 to about 150, preferably from about 35 to about 145, preferably from about 45 to about 140, preferably from about 50 to about 135, preferably from about 55 to about 130, preferably from about 60 to about 130, preferably from about 75 to about 130, preferably from about 90 to about 125, preferably from about 95 to about 130, preferably from about 100 to about 125, and preferably from about 105 to about 120, according to Goniospectrophotometry Method described herein.

FF. The article according to Paragraphs A-EE, wherein the first skin layer is 10% thicker than the second skin layer, preferably 20% greater, preferably 25% greater, preferably 30% greater, preferably 40% greater, and preferably 50% greater, as measured according to the Layer Thickness Method described herein.

GG. The article according to Paragraphs A-FF, wherein the average panel wall thickness comprises from about 30% to about 80% core, preferably from about 35% to about 75% core, preferably from about 40% to about 70% core, preferably from about 45% to about 65% core, preferably from about 50% to about 60% core, as measured according to the Layer Thickness Method described herein.

HH. The array of Paragraph C, wherein the ΔE*–15° vs 45° using illumination at 45°, ΔL*, and mean C* of each article varies by less than 5 units, preferably less than 4 units, preferably less than 3 units, preferably less than 2 units, and preferably less than 1 unit across the array, as measured according to Goniospectrophotometry Method described herein.

II. The array of Paragraph C, wherein the ΔE*–15° vs 45° using illumination at 45°, ΔL*, and mean C* of each article varies by less than 5 units, preferably less than 10%, preferably less than 7%, preferably less than 5%, preferably less than 3%, preferably less than 2%, and preferably less than 1% across the array.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molded multilayer article comprising:
   a. a hollow body defined by a wall comprising an inner surface and an outer surface, the wall being formed in at least one region by 3 or more layers comprising:
   i. a first skin layer and a second skin layer comprising:
   from about 94% to about 99.5% by weight of the first skin layer and second skin layer of a mechanically recycled thermoplastic material comprising a first thermoplastic material; and
   0.5% to 2% by weight of the first or second skin layers of a dye, pigment, and/or an effect pigment producing a chroma of 15 or greater in the blow molded multilayer article;
   wherein the first skin layer comprises the outer surface of the wall in the region and the second skin layer comprises the inner surface of the wall in the region;
   ii. a core sandwiched between the first skin layer and the second skin layer, wherein the core comprises:
   from about 90% to about 99% mechanically recycled thermoplastic material by weight comprising a second thermoplastic material and greater than 200 ppm impurities wherein the article comprises greater than 92% mechanically recycled thermoplastic material by weight and wherein the mechanically recycled thermoplastic comprises green, brown, gray, black, blue, and/or combinations thereof.

2. The blow molded article of claim 1, wherein the mechanically recycled thermoplastic material comprises from about 0.01% to about 2% impurities by weight.

3. The blow molded article of claim 1, wherein the effect pigment comprises particles having a face wherein the particles are oriented so the face is parallel to the outer surface.

4. The blow molded article of claim 1, wherein the first thermoplastic material and/or the second thermoplastic is selected from the group consisting of polyethylene terephthalate, polyethylene terephthalate glycol, polystyrene, polycarbonate, polyvinylchloride, polyethylene naphthalate, polycyclohexylenedimethylene terephthalate, glycol-modified PCT copolymer, copolyester of cyclohexanedimethanol and terephthalic acid, polybutylene terephthalate, acrylonitrile styrene, styrene butadiene copolymer, low-density polyethylene, linear low-density polyethylene, high-density polyethylene, polypropylene, and a combination thereof.

5. The blow molded article of claim 4, wherein the first thermoplastic material and the second thermoplastic material are the same.

6. The blow molded article of claim 4, wherein the first thermoplastic material and the second thermoplastic material comprise polyethylene terephthalate and the article comprises a 20° gloss of greater than or equal to 65 GUs.

7. The blow molded article of claim 1, wherein the article is a bottle.

8. An array of articles, wherein each article comprises the blow molded article of claim 1.

9. The array of articles of claim 8, wherein each article comprises a ΔE*–15° vs 45° using illumination at 45°, ΔL*, and mean C* and the ΔE*–15° vs 45°, ΔL* of each article varies by less than 3 units across the array.

10. A blow molded multilayer article comprising:
    a. a hollow body defined by a wall comprising an inner surface and an outer surface, the wall being formed in at least one region by 3 or more layers comprising:

i. a first skin layer and a second skin layer comprising:
from about 94% to about 99.5%, by weight of the first
skin layer and second skin layer, of a mechanically
recycled thermoplastic material and 0.5% to 2% by
weight of the first or second skin layers of a dye,
pigment, and/or an effect pigment producing a chroma
of 15 or greater in the blow molded multilayer article;
wherein the first skin layer comprises the outer surface of
the wall in the region and the second skin layer com-
prises the inner surface of the wall in the region;
ii. an opaque core sandwiched between the first skin layer
and the second skin layer, wherein the core comprises:
from about 90% to about 99% mechanically recycled
thermoplastic material by weight comprising a second
thermoplastic material and an L* value of less than or
equal to 80;
wherein the first skin layer and the core are interpen-
etrated at an interface between the first skin layer and
the core; and wherein the article comprises greater than
92% mechanically recycled thermoplastic material by
weight.

11. The blow molded article of claim 10, wherein the
mechanically recycled thermoplastic material comprises
mechanically recycled polyethylene terephthalate.

12. The blow molded article of claim 10, wherein the
mechanically recycled thermoplastic material further com-
prises at least 200 ppm impurities.

13. The blow molded article of claim 10, wherein the core
comprises from about 0.1% to about 6% pigment by weight
wherein the pigment comprises opacifying pigment com-
prising particles comprising a particle size larger than 15
nm.

14. The blow molded article of claim 10, wherein the
interface comprises a thickness from about 500 nm to about
125 μm.

15. The blow molded article of claim 10, wherein the
article comprises a Critical Normal Load greater than 50 N.

16. The blow molded article of claim 10, wherein the core
layer comprises a L* of less than or equal to 60.

17. The blow molded article of claim 10, comprising a
$\Delta E^*$–15° vs 45° using illumination at 45°, a $\Delta L^*$, and a
mean C* wherein the $\Delta E^*$–15° vs 45°, the $\Delta L^*$, and the
mean C* are within about 6 units of a second multilayer
structure comprising skin layers having the same elements
as the first skin layer and the second skin layer and a core
having the same elements as the core except comprising a
virgin thermoplastic material instead of the mechanically
recycled thermoplastic material.

18. The blow molded article of claim 10, wherein the
$\Delta E^*$–15° vs 45° using illumination at 45° of from about 25
to about 150.

19. The blow molded article of claim 10, wherein an
average panel wall thickness comprises from about 30% to
about 80% core.

* * * * *